(12) United States Patent
Aby-Eva et al.

(10) Patent No.: US 7,984,554 B2
(45) Date of Patent: Jul. 26, 2011

(54) EGG SLICER

(75) Inventors: Gregiore Bernard Aby-Eva, Pittsburgh, PA (US); Michael John Laskowski, Pittsburgh, PA (US); Eugene Rye Kaneko, Astoria, NY (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 12/729,798

(22) Filed: Mar. 23, 2010

(65) Prior Publication Data

US 2010/0175569 A1 Jul. 15, 2010

Related U.S. Application Data

(62) Division of application No. 11/879,577, filed on Jul. 17, 2007.

(51) Int. Cl.
*A21C 5/00* (2006.01)
(52) U.S. Cl. .............. 30/116; 30/117; 30/303; 30/304
(58) Field of Classification Search .............. 30/114, 30/117, 116, 303, 304; 83/597, 651.1, 932; 99/545, 543, 537
See application file for complete search history.

(56) References Cited

U.S. PATENT DOCUMENTS

| 1,379,724 | A | | 5/1921 | Russell |
|---|---|---|---|---|
| D85,385 | S | | 10/1931 | Lowitz |
| 2,453,599 | A | * | 11/1948 | Schlegel ................ 83/509 |
| 3,132,423 | A | | 5/1964 | DeLano |
| 3,145,743 | A | | 8/1964 | Cronheim |
| 3,369,582 | A | | 2/1968 | Giangiulio |
| 3,800,649 | A | | 4/1974 | Chinn |
| 4,383,365 | A | | 5/1983 | Metzigian |
| 4,466,346 | A | | 8/1984 | Gemelli |
| 4,569,266 | A | | 2/1986 | Ando |
| 4,599,928 | A | | 7/1986 | Oker |
| D364,999 | S | | 12/1995 | Malinosky |
| 5,520,104 | A | | 5/1996 | Ancona et al. |
| 5,692,424 | A | | 12/1997 | Wallace |
| 5,749,145 | A | | 5/1998 | Baukloh |
| 5,791,237 | A | | 8/1998 | Gibson |
| 6,237,474 | B1 | | 5/2001 | Short et al. |
| 6,427,332 | B1 | | 8/2002 | Pi |
| D589,309 | S | * | 3/2009 | Olivari ..................... D7/672 |
| 2009/0007804 | A1 | * | 1/2009 | Heck et al. .................. 99/543 |

OTHER PUBLICATIONS

International Preliminary Report on Patentability dated Jan. 28, 2010 of Applicants' corresponding PCT application.

* cited by examiner

*Primary Examiner* — Boyer D Ashley
*Assistant Examiner* — Omar Flores-Sánchez
(74) *Attorney, Agent, or Firm* — Seyfarth Shaw LLP

(57) ABSTRACT

An apparatus for partitioning a food mass, such as a solidified egg, is disclosed including a base, a holder for supporting the food mass, and a plurality of cutting members for partitioning the food mass, wherein the holder is rotatable to permit the cutting members to partition the food mass in a first orientation and in a second orientation. The apparatus further includes a retainer positionable on a top surface of the food mass having passageways permitting the cutting members to pass through a portion thereof. The apparatus may include a cleaning plate receivable by portions of the holder in a position below the food mass, the cleaning plate being removable from the holder to remove food matter from between the support portions. The apparatus may include a lock for securing apparatus in a closed or lowest position for storage.

2 Claims, 21 Drawing Sheets ic # EGG SLICER

CROSS REFERENCE TO RELATED APPLICATION

This application is a Divisional of U.S. patent application Ser. No. 11/879,577, entitled "EGG SLICER", filed Jul. 17, 2007.

FIELD OF THE INVENTION

The invention relates to a device for slicing food and, in particular, to a device for cubing a solidified egg having a cleaning plate and a holder for restraining the cut egg portions.

BACKGROUND

Currently, a variety of devices are known for cutting a solidified egg. As used herein, a solidified egg is an egg that has been heated so that the yolk and white have become a solidified mass and that has had the shell removed. Typically, a solidified egg is an egg that has been hard-boiled and then de-shelled so that the white, and yolk therein, can be handled as a mass. Devices for slicing the solidified egg, referred to as egg slicers, are used to divide the solidified egg so that egg portions may be used in recipes or salads. An egg slicer may be preferred to hand-cutting the egg as a cleaner and simpler method with greater precision. As a convention used herein, the term egg mass refers to the entire solidified egg without the shell, and egg portion refers to a cut or sliced piece of the solidified egg.

There are numerous configurations for egg slicers. Some of these egg slicers provide a first set of cutting members, either blades are wires, that are pivotally attached to a base holder on which the egg mass rests. This allows the egg mass to be cut into strips or sections along one axis of the egg. In order to provide a cubing feature, some egg slicers further include a second set of cutting members, also pivotally attached to the base holder. After the first set of cutting members passes through the egg mass, the second set is then used to cut the strips into egg cubes. It should be noted that the term cube as used herein is imprecise as the two sets of cutting members make orthogonal cuts in a substantially vertical direction, though no cutting members are employed to make a third cut in the horizontal direction. One problem with these devices is that two sets of blades or cutting members are required, which makes the egg slicer more expensive to manufacture and increases the amount of labor in cleaning the device.

One alternative to the paired sets of cutting members is to have a single set of cutting members with orthogonally arranged blades. In essence, the two cutting members of the other cubing egg slicers combined into a single set. In one pass, the egg mass is cut lengthwise and widthwise to form the cubes. However, this forces a user to cube the egg and prevents the user from selecting egg slices.

An issue common to each of the cubing egg slicers is that there is no structure to restrain the egg slices after the first cut has been made. Thus, after the first cut is made, the egg portions tend to fall or list away from each other. A user may have to collect these after the cutting. Additionally, when transporting the egg portions from the slicer to a serving dish, for instance, one must be careful when grasping multiple egg portions at a time, which are fragile and the yolk portion may fall away from the white portion if not properly supported. Furthermore, slicers employing a pair of sets of cutting members may require a user to manually hold the egg slices upward while the other set of cutting members is brought into contact with the egg portions.

It is common for the base holder, the portion that supports the food or egg mass, to have recesses or slots for receiving the cutting members. This allows the cutting member, whether it be a wire or a blade, to pass all the way through the egg or food mass. However, it is equally as common for some of the egg mass to be separated from the egg portions and driven into the holder slots. This can make clean up difficult as the egg may become pressed into the slot.

Accordingly, there has been a need for an improved device or apparatus for partitioning an egg or other food mass, such as an egg slicer.

SUMMARY

In accordance with an aspect, an apparatus for partitioning a food mass, such as a solidified egg, is disclosed including a base, a holder for supporting the food mass on the base, the holder being connected to the base, and a plurality of cutting members movable relative to the holder for partitioning the food mass, wherein the holder is rotatable to and between at least a first position and a second position relative to the cutting members, the first position permitting the cutting members to partition the food mass in a first orientation and the second position permitting the cutting members to partition the food mass in a second orientation different from the first orientation.

In one form, the apparatus includes a cutting frame pivotally connected to the base, wherein the cutting members are substantially elongated in a parallel relationship and supported by the cutting frame. The first position may be a predetermined position, and the second position may be a predetermined position. The holder may include a first set of recesses or channels permitting the cutting members to be received therein with the holder in the first position, and a second set of recess channels permitting the cutting members to be received therein with the holder in the second position. The holder may have a top surface contoured for receiving the food mass, and the top surface may provide a specific orientation for the food mass relative to the holder.

The apparatus may further include a retainer positionable on a top surface of the food mass supported by the holder. The retainer may include recesses or passageways permitting the cutting members to pass through a portion thereof.

The apparatus may further include a cleaning member or plate. To accommodate the cleaning plate, the holder may include a plurality of support portions extending upwardly to support the food mass thereon, the cleaning member being receivable between the support portions in a position below the food mass, and the cleaning member being removable from the holder to remove food matter from between the support portions.

In another aspect of the invention, an apparatus for partitioning a food mass is disclosed including a base, a holder for supporting the food mass on the base, the holder being connected to the base, a plurality of cutting members movable relative to the holder for partitioning the food mass, and a retainer movable relative to the holder, the retainer positionable on a top surface of the food mass supported by the holder.

The apparatus may further include a cutting frame, wherein the cutting members are substantially elongated in a parallel relationship and supported by the cutting frame, and the retainer and cutting frame are pivotally connected to the base. The retainer and cutting frame may rotate relative to the holder and around a common axis or axle. The retainer and the cutting frame may be pivotally movable relative to each other between a normal rest condition and a cutting condition. The apparatus may also include bias structure resiliently urging the retainer and the cutting frame to their normal rest condition.

The retainer may include retainer recesses or passages permitting the cutting members to pass through a portion thereof. The retainer recesses may be elongated slots or passageways, and the cutting members are biased into the slots and movable from the slots for partitioning the food mass supported by the holder.

In a further aspect, an apparatus including a lock for securing the retainer against the holder and for securing the cutting frame relative to the retainer is disclosed.

In another aspect, an apparatus for partitioning a food mass is disclosed including a base, a holder for supporting the food mass on the base, the holder being connected to the base, a plurality of cutting members movable relative to the holder for partitioning the food mass, and a cleaning member or plate, wherein the holder includes a plurality of support portions extending upwardly to support the food mass thereon, the cleaning member being receivable between the support portions in a position below the food mass, and the cleaning member being removable from the holder to remove food matter from between the support portions.

The cleaning member may be plate-like and may includes openings for receiving the support portions. The holder may include first and second sets of recesses between the support portions permitting the cutting members to received therein, the cleaning member being received in the holder recesses. The first set of holder recesses or channels may be oriented substantially orthogonal to the second set of holder recesses or channels, first cutting members may be receivable within the first set of holder recesses and second cutting members may be receivable within the second set of holder recesses, and the cleaning member may include openings for receiving the support portions. The cleaning member may include openings for receiving the support portions, the openings being for closely receiving the support portions.

DETAILED DESCRIPTION

Figure 1:
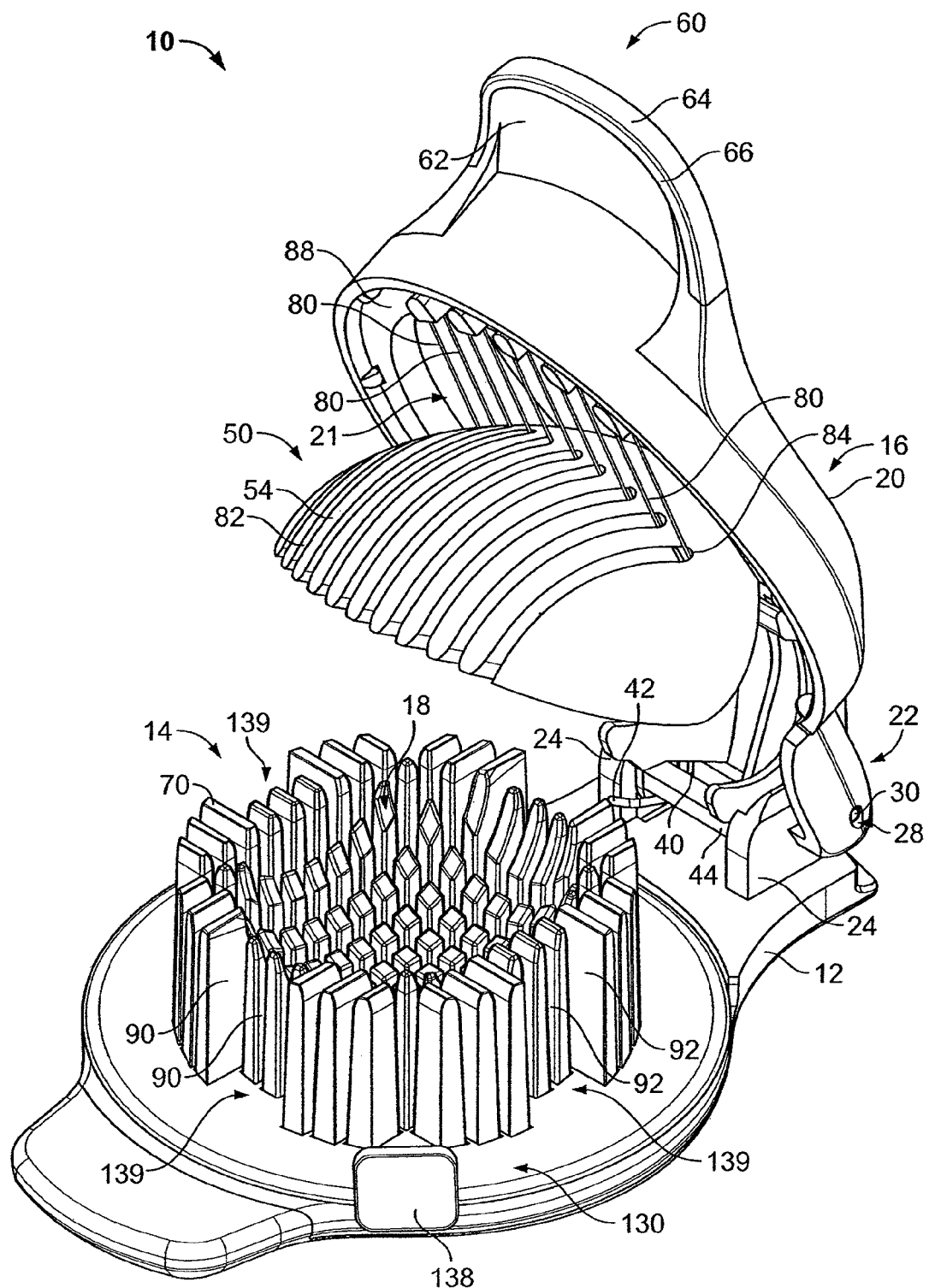
FIG. 1 is a perspective view of an egg slicer of the present invention in an open position.

Referring initially to FIG. 1, a device for partitioning solid food mass, such as a solidified egg mass, is shown as an egg slicer 10. The egg slicer 10 includes a base 12 which is typically rested on a surface during operation. The base 12 carries a holder 14 that receives and supports the egg mass during the cutting or slicing process. A slicing mechanism 16 is pivotally attached to the base 12 and, in FIG. 1, is shown in a fully open position or configuration. As such, the slicing mechanism 16 is positioned to allow the food mass to be positioned on the top of the holder 14. In the design shown, the slicer 10 is designed for cutting a solidified egg mass. As such, the holder 14 is contoured to have a recess 18 for receiving the rounded or ovoid shape of the egg mass.

Figure 8:
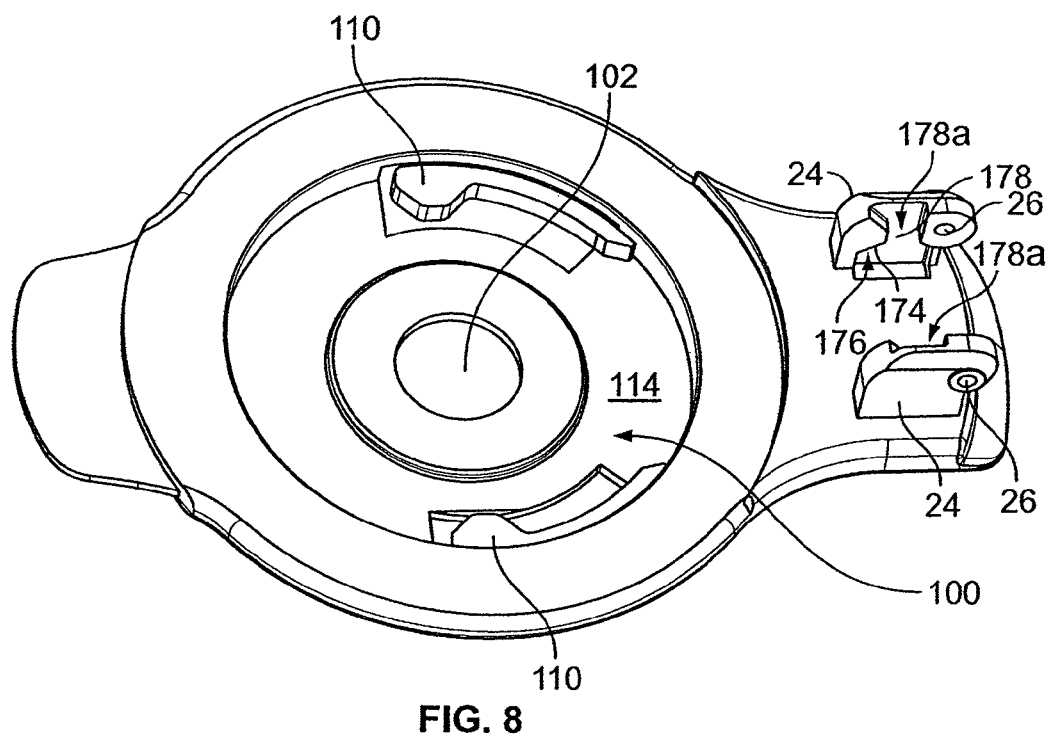
FIG. 8 is a perspective view of a top side of a base of the egg slicer of FIG. 1.
Figure 9:
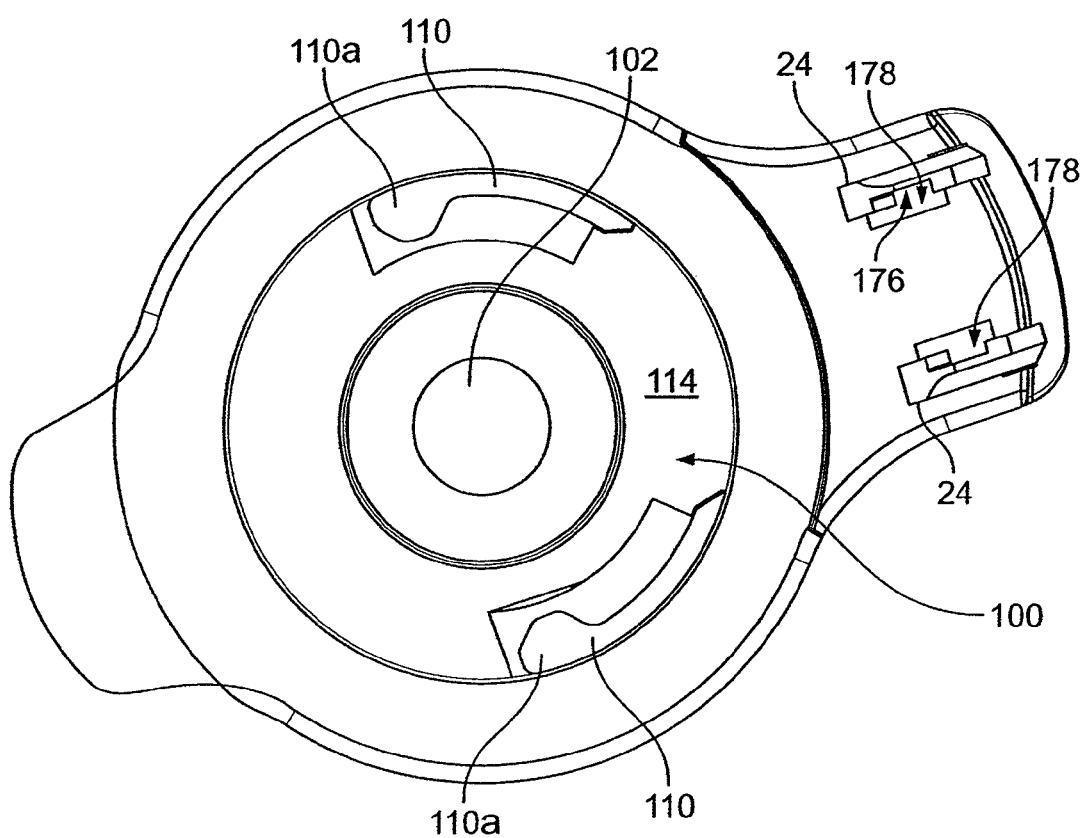
FIG. 9 is a top plan view of the base of FIG. 8.

The slicing mechanism 16 includes a frame 20 which is pivotally attached at a pivot end 22 with the base 12. The base 12 includes upstanding walls 24 each having a bore 26 therethrough (see FIG. 8). The pivot end 22 includes a pair of bores 28 which, for assembly of the slicer 10, are aligned with the wall bores 26 so that an axle 30 may be inserted. However, the pivot end 22 may alternatively include portions formed or secured integrally with the pivot end 22 that are then received in the wall bores 26 to permit relative rotation between the slicing mechanism 16 and the base 12.

Figure 13:
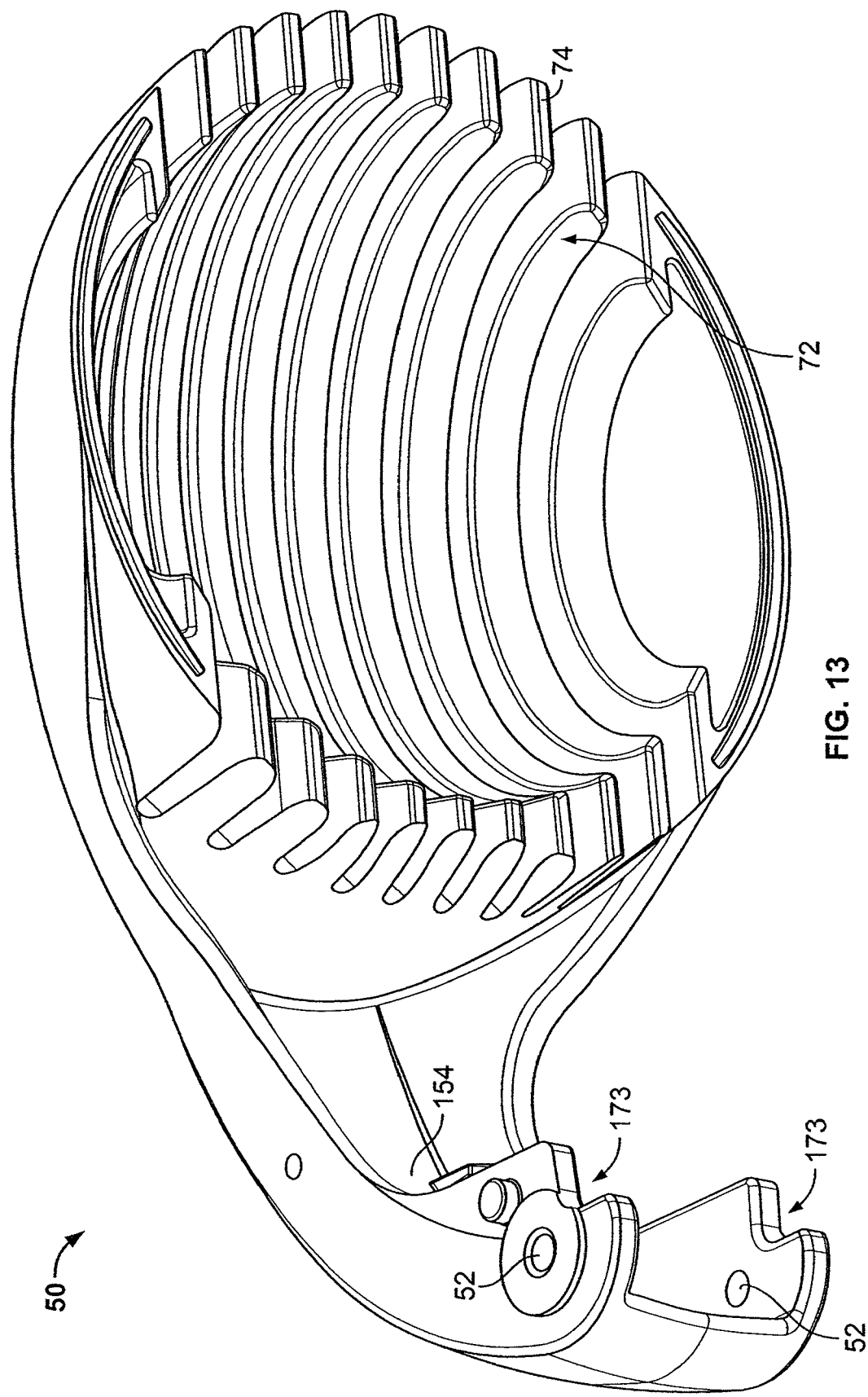
FIG. 13 is a perspective view of a retainer of the egg slicer of FIG. 1.

A retainer 50, best viewed in FIG. 13, is pivotally attached to the frame 20. Towards this end, the retainer 50 includes bores 52 that are aligned with the wall bores 26 and the pivot end bores 28 so that the axle 30 is inserted within each, and the retainer 50 and the frame 20 pivot around a common axis provided by the axle 30. A spring 40, such as a coil spring, is positioned with a first end 42 (FIG. 1) in contact with a bottom side 44a of a bridge portion 44 (FIGS. 1, 15) of the frame 20, and a second end 46 (FIG. 15) positioned against a portion of the retainer 50. As such, movement of the frame 20 and the retainer 50 are biased apart by the bias of the spring 40 to a normal rest condition shown in FIGS. 1 and 2. The torsion on the coil spring 40 resists relative movement of the retainer 50 and frame 20 to a cutting condition, such as that shown in FIG. 3. Such movement increases the size of the coil.

Figure 2:
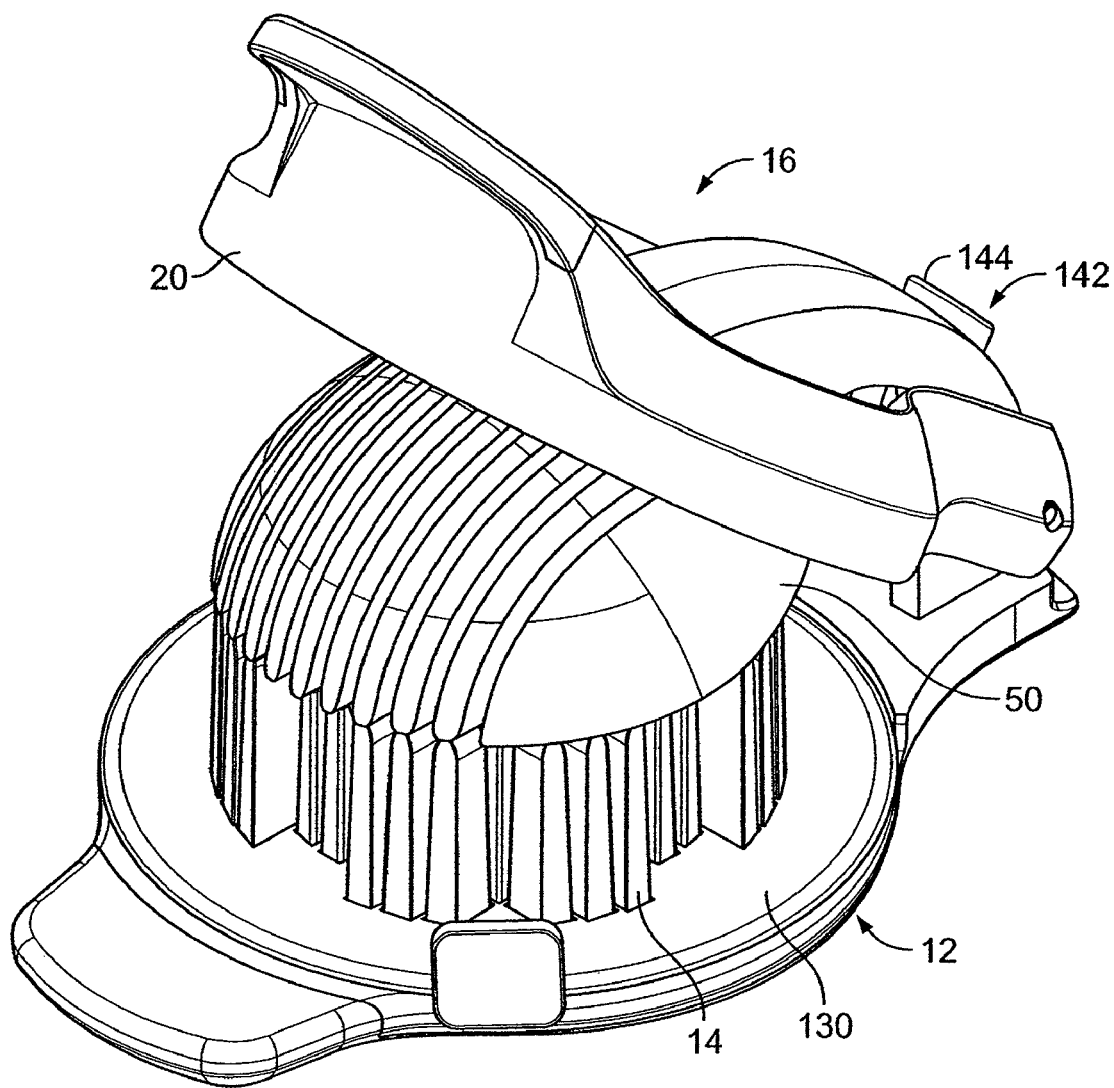
FIG. 2 is a perspective view of the egg slicer of FIG. 1 in an intermediate position with a retainer in contact with a holder.

Referring now to FIG. 2, the slicing mechanism 16 is shown in an intermediate position. As can be seen, the slicing mechanism 16 (retainer 50 and the frame 20) has been moved towards the holder 14. Movement of the slicing mechanism 16 is facilitated by the frame 20 having a handle end 60 opposite the pivot end 22, the handle end 60 provided with an extending lip 62 forming a handle 64. The handle 64 may be ergonomically shaped and may be covered with a grip material 66, such as rubber or Santoprene, for instance.

Figure 10:
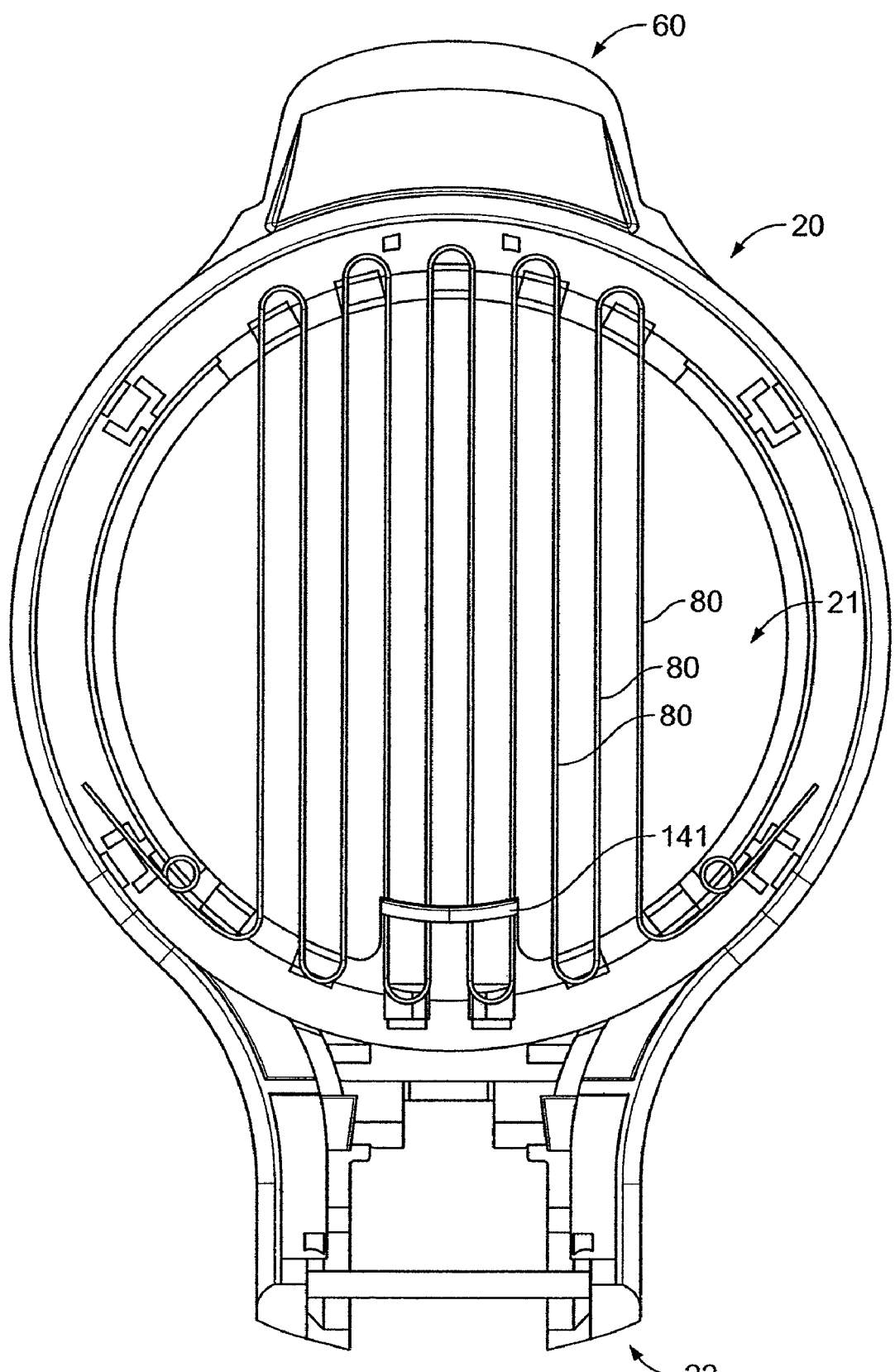
FIG. 10 is a bottom plan view of a frame of a slicing mechanism of the egg slicer of FIG. 1.

Additionally, when the frame 20 is moved towards the holder 14, the retainer 50 (biased away from the frame 20 by the spring 40) is also moved towards the holder 14. As shown in FIG. 2, the retainer 50 is positioned against the holder 14. More specifically, a perimeter portion 70 of the holder 14 surrounding the recess 18 is contacted by the retainer 50. With reference to FIG. 10, it can be seen that the retainer 50 is also contoured to receive the egg mass therein and, as such, has a recess 72 surrounded by a perimeter portion 74 which contacts the perimeter portion 70 of the holder 14 when in the intermediate position, as well as the closed or lowest position, discussed below. It should be noted that the size of the egg mass determines whether the perimeter portions 70, 74 of the holder 14 and retainer 50 are brought into contact. Were the egg to be particularly large, its size would generally restrict or prevent the holder 14 and retainer 50 from coming into contact.

Figure 3:
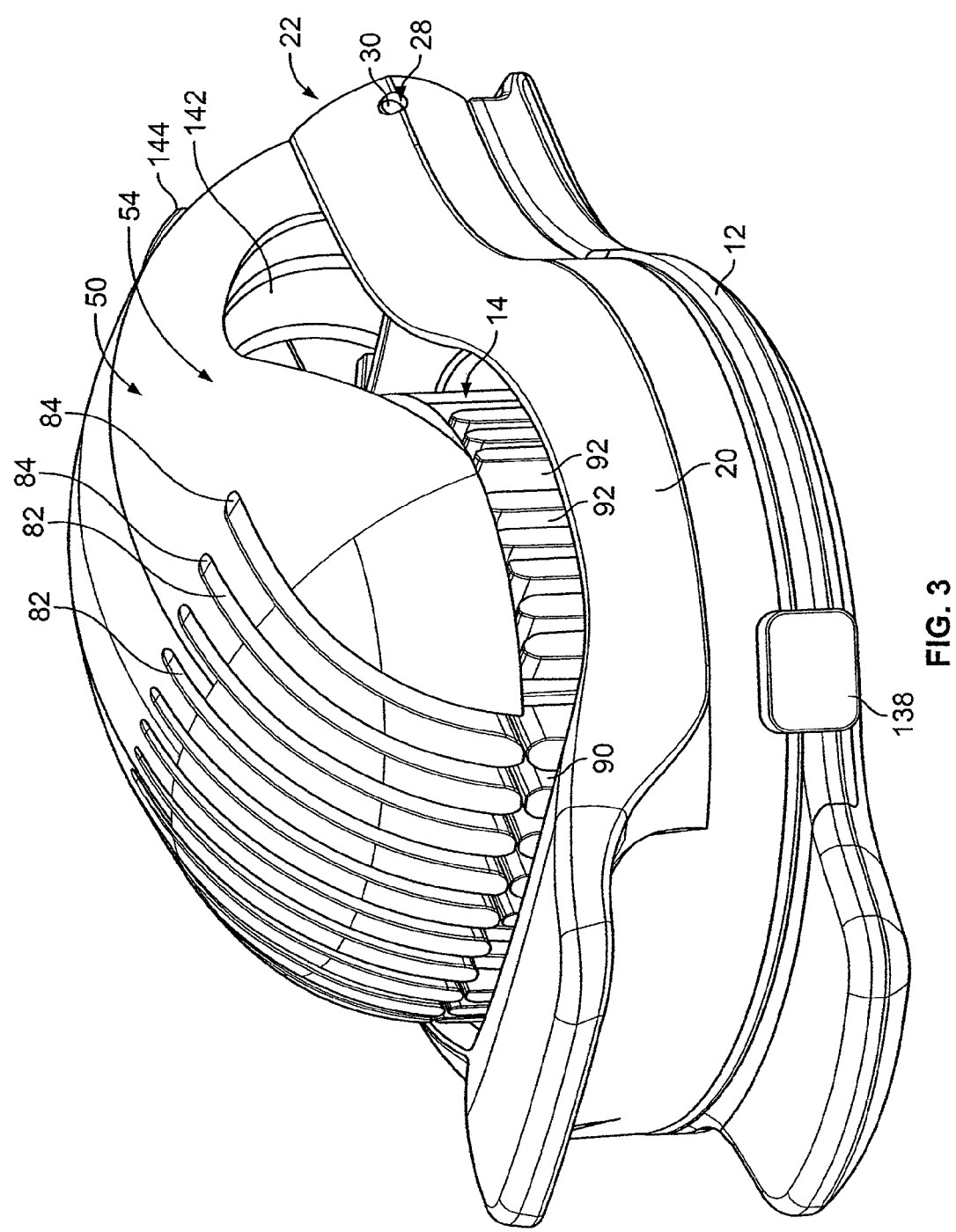
FIG. 3 is a perspective view of the egg slicer of FIG. 1 in a lowest position.

Referring now to FIG. 3, the slicing mechanism 16 is shown in a lowest position or configuration. As can be seen, the frame 20 is moved from its position in the intermediate configuration to a lower point. This movement requires overcoming the bias of the spring 40 between the retainer 50 and the frame 20. It is in this movement that the cutting of the food mass or egg takes place.

More specifically and best seen in FIG. 10, the frame 20 includes a set of generally parallel cutting members 80, preferably wires, extending generally parallel and in the direction between the pivot end 22 and the handle end 60. The frame 20 is provided with an opening 21 sized to be greater than the holder 14 so that, in the lowest position, the holder 14 may be positioned within the opening 21, the cutting members 80 being secured within and across the opening 21.

The retainer 50 includes a series of groove-like passages 82 extending from a top surface 54 thereof to its recess 72 and perimeter portions 74 located on the bottom side of the retainer 50. As can be seen in FIG. 1, the cutting members 80 are positioned proximate or at a rear end 84 of the passages 82 such that, when the frame 20 is lifted or biased upward, the cutting members 80 contact the rear ends 84 to lift the retainer 50 away from the holder 14 and any food mass located thereon. Moving to the intermediate position, the retainer 50 and frame 20 generally move together with the cutting members 80 biased against the passage rear ends 84. Once the retainer 50 is resting on top of the food mass located in the holder 14, or with the perimeter portions 70, 74 of the holder 14 and retainer 50 contacting each other, the retainer 50 ceases to move downward with the frame 20 and the cutting members 80. Movement of the frame 20 continues downward as the cutting members 80 slice through the food mass and as the cutting members 80 pass forwardly through the passages 82, overcoming the bias of the spring 40. The cutting members 80 may be supported and secured with a secondary frame 88 that is secured with the frame 20. This allows for ease of manufacture and assembly of the slicer 10, as well as permits replacement of the cutting members 80.

The cutting members 80 also pass into the holder 14 so that the food mass may be cut through. The holder 14 includes first and second sets of parallel, vertical channels 90, 92, the first and second sets 90, 92 being orthogonally oriented relative to each other, details of which will be discussed below. As the frame 20 passes through the food mass to the lowest position of FIG. 3, the cutting members 80 are received by one of the sets of channels 90, 92 that is aligned with the cutting members 80. In this manner, slices of the food mass such as a solidified egg are made in a first orientation. The frame 20 is then lifted upward, the cutting members 80 being raised from the sets of channels 90, 92 and from the egg, to the intermediate position shown in FIG. 2. The holder 14 may then be rotated 90 degrees, thus rotating the food mass thereon, and a second cutting motion may then be made to cut the food mass in a second orientation. This second cut 'cubes' the food mass, as desired. During the first cutting motion, the first set of channels 90 is aligned with the cutting members 80, while in the second the second set of channels 90 is aligned with the cutting members 80. After the first cutting motion, release of the handle 64 allows the spring 40 to lift the frame 20 upward relative to the retainer 50 as well as relative to the holder 14 and the food mass.

Referring now to FIGS. 4-7, the holder 14 is shown in perspective. As can be seen, the holder 14 has a generally cylindrical shape. FIGS. 5-9 and 14-16 show the cooperation between the base 12 and the holder 14 permitting the rotation of the holder 14 relative to the base 12. More precisely, the base 12 permits rotation of the holder 14 relative to the base 12.

The base 12 includes a shallow cylindrical recess 100 surrounding a central opening 102. The cylindrical recess 100 is generally sized to be slightly larger than the cylindrical shape of the holder 14 so that the holder 14 sits therewithin. The holder 14 has a bottom surface 104 that is generally flat. The holder bottom surface 104 further includes an irregular wall 106 extending downwardly therefrom, the wall 106 having several inward notches 108 for defining positions for the holder 14 relative to the base 12. The base 12 includes a pair of resiliently deflectable fingers 110 that cooperate with the wall 106 and notches 108 to retain the holder 14 in a defined position relative to the base 12. As the holder 14 is rotated relative to the base 12, side portions 108a cause lobes 110a formed on the deflectable fingers 110 to cam out of the notches 108 to a position on the perimeter of the wall 106, generally. The holder 14 is then further rotated to a position where the lobes 110a are aligned with subsequent notches 108, at which point they fingers 110 shift inwardly towards their natural position and into the notches 108. Alternatively, one or more springs or bias members (not shown) may be utilized instead of the deflectable fingers, whereby the springs would be mounted or secured with the base 12 and have portions corresponding to the lobes 110a and cam into and out of the notches 108 when the holder 14 is rotated. Such springs may, for instance, be formed of a metal wire.

Figure 5:
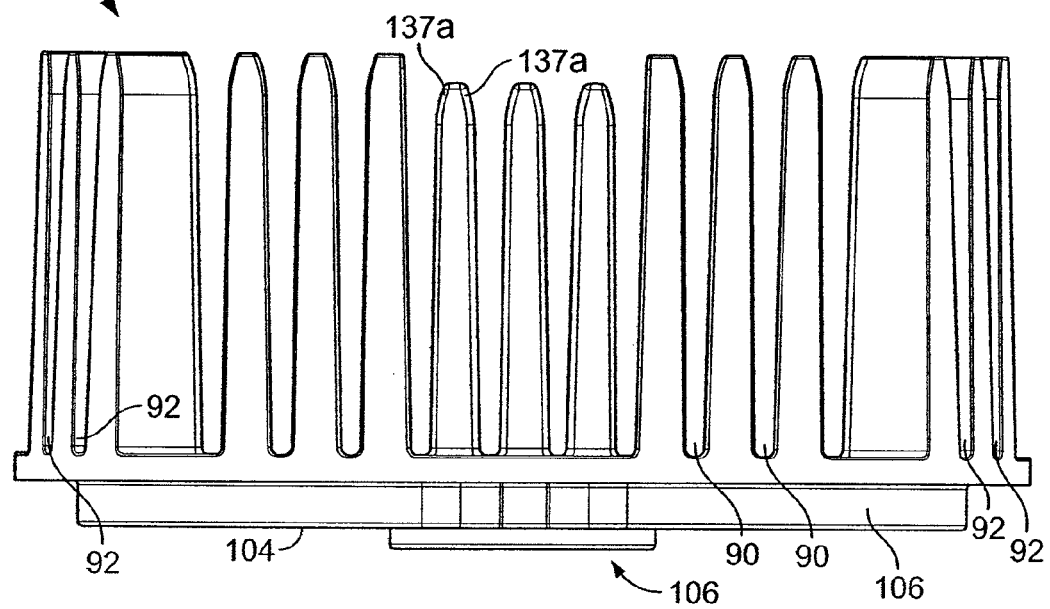
FIG. 5 is an enlarged side elevation view of the holder of FIG. 4.
Figure 6:
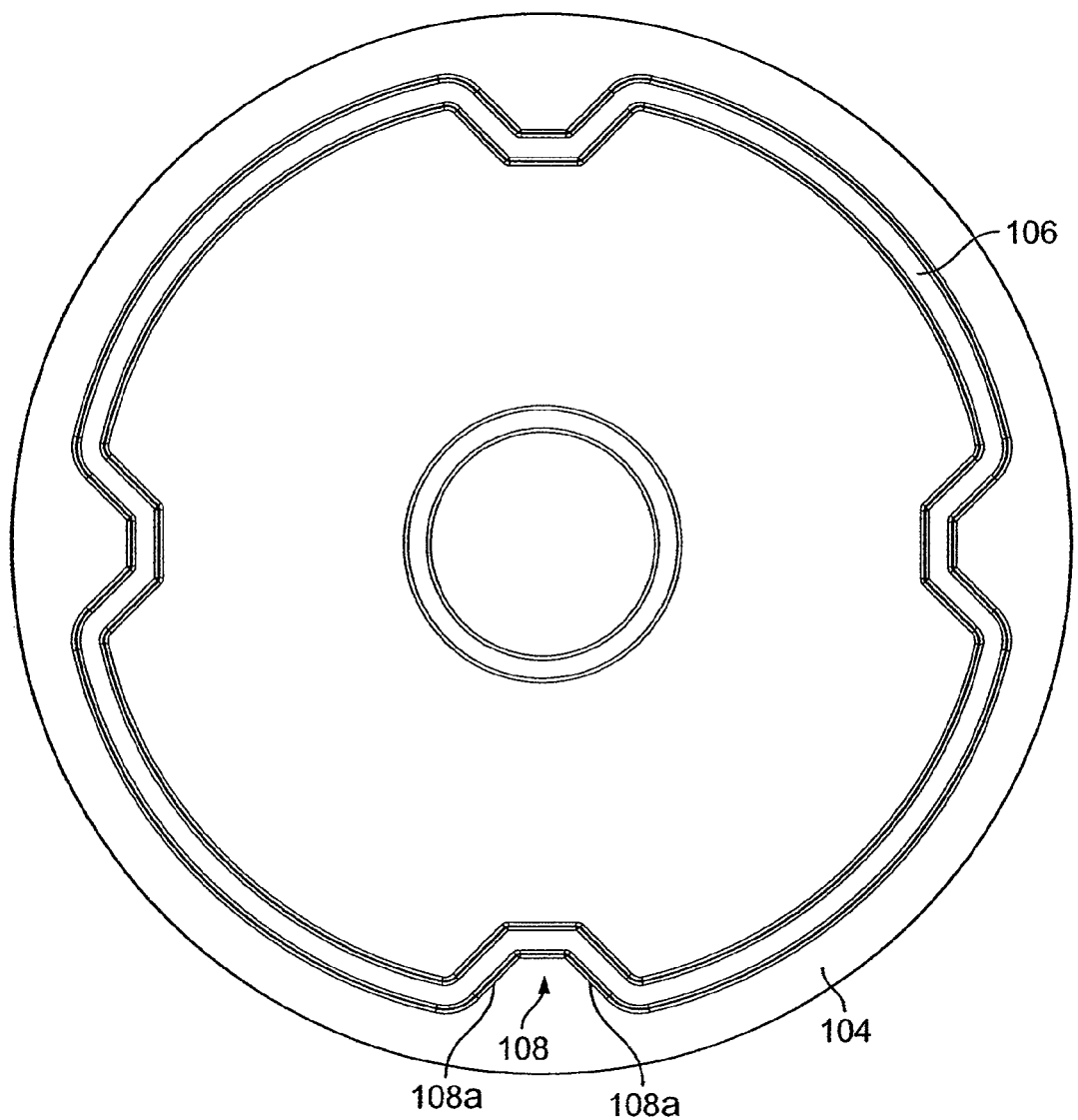
FIG. 6 is a plan view of a bottom side of the holder.
Figure 7:
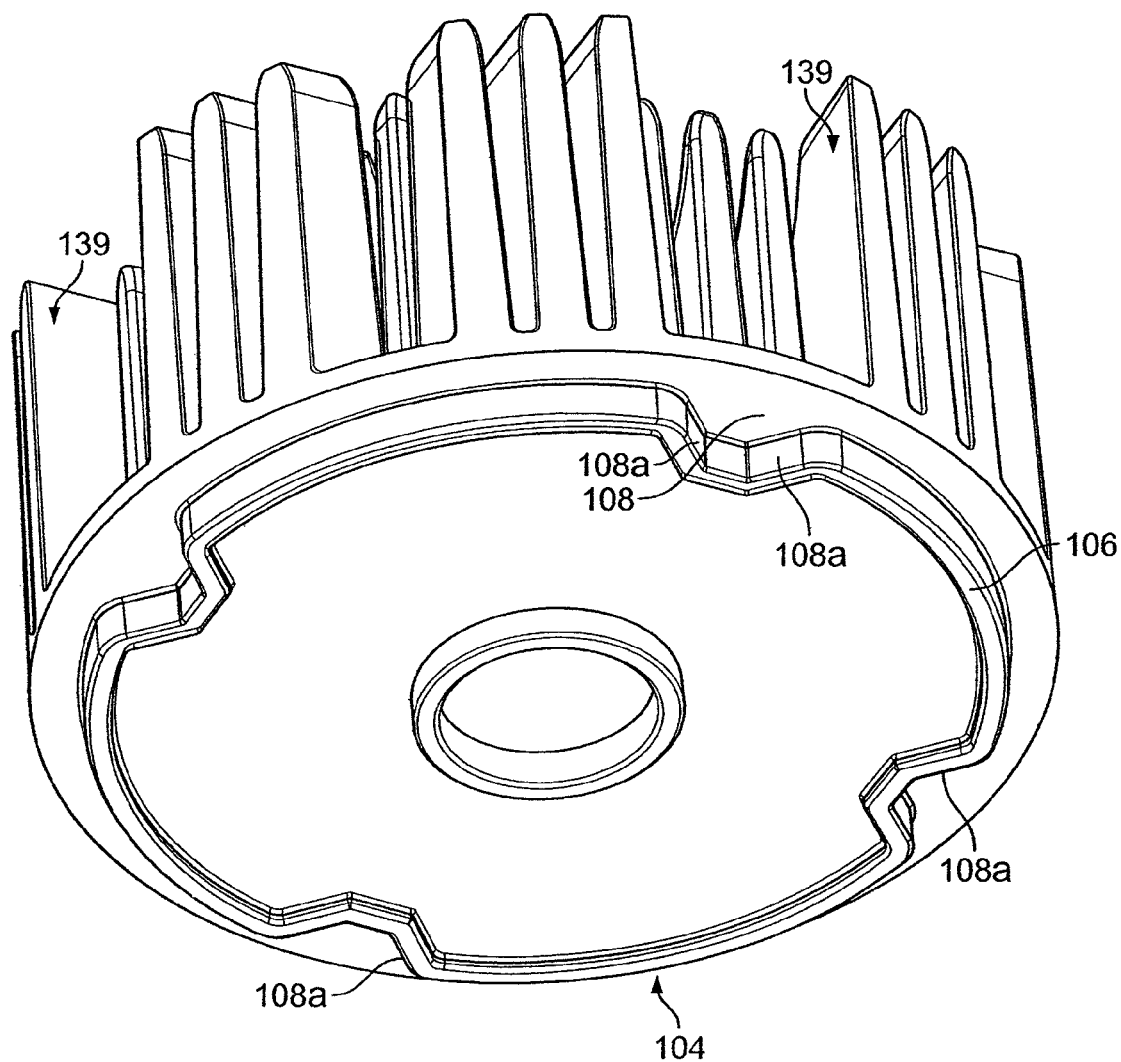
FIG. 7 is a perspective view of the bottom side of the holder.
Figure 14:
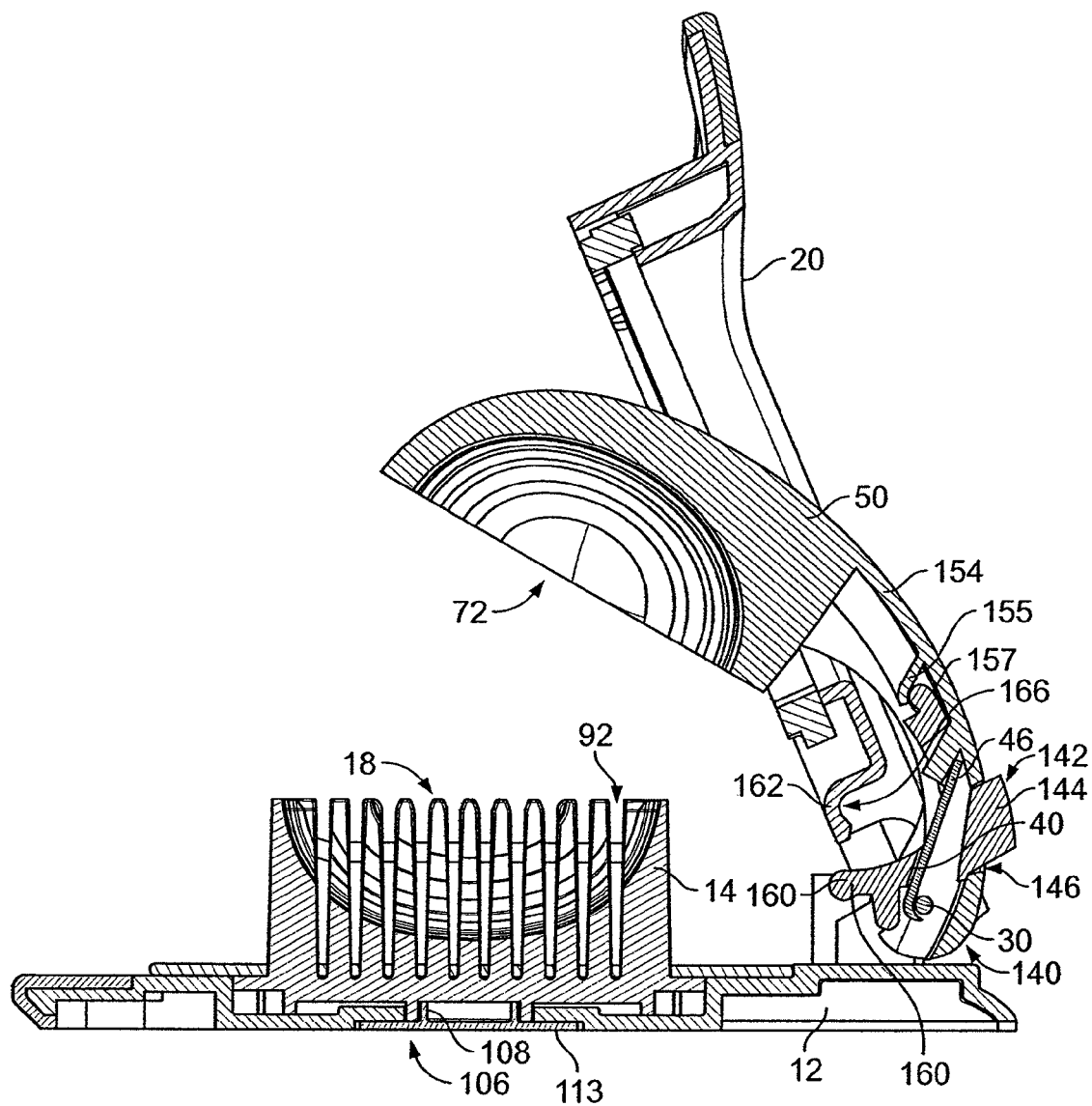
FIG. 14 is a cross-sectional side view of the egg slicer in the open position of FIG. 1.

As can be seen from FIGS. 5 and 14, the holder 14 has a central annular wall 112 that extends through the base opening 102. A plug 113 (FIG. 14) is bonded with the wall 112 to secure the plug 113 and the holder 14 around the base 12. The cooperation of the finger lobes 110a and the notches 108 provide a user with a tactile feel of the proper positioning of the holder 14 so that the cutting members 80 are properly aligned with the sets of channels 90, 92.

Figure 11:
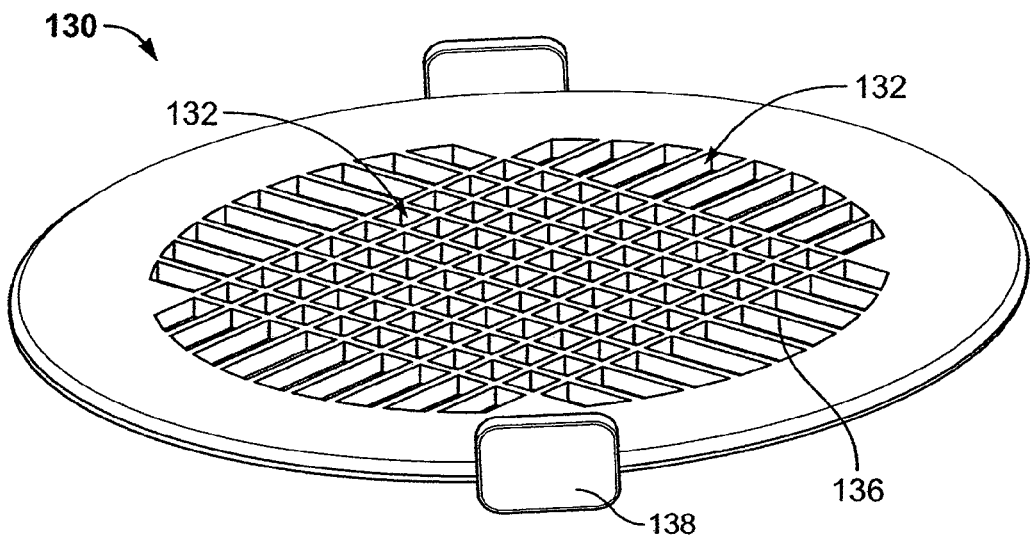
FIG. 11 is a perspective view of a cleaning plate of the egg slicer of FIG. 1.
Figure 12:
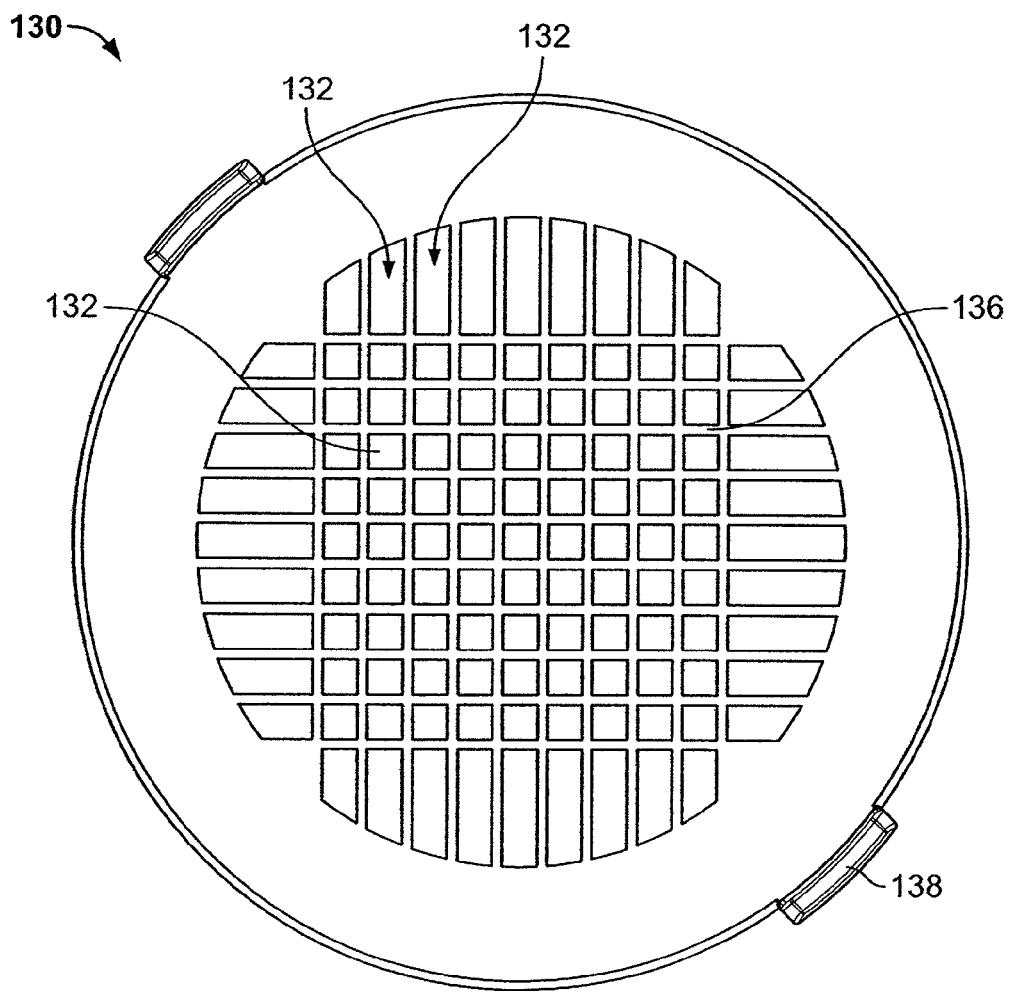
FIG. 12 is an enlarged plan view of the cleaning plate of FIG. 11.

While it is clear that the holder 14 may be manually rotated by a user by gripping the holder 14 itself, the preferred embodiments utilize a cleaning plate 130 which is used to rotate the holder 14 relative to the base 12. The cleaning plate 130 is best viewed in FIGS. 1, 11 and 12. In FIGS. 11 and 12, the cleaning plate 130 can be seen as having a openings 132 formed by a grid 136. The grid 136 corresponds to the sets of channels 90, 92 so that the cleaning plate 130 can be placed down on top of the holder 14 with the grid 136 within the channels 90, 92. Viewed another way, the holder 14 includes an array of support portions 137 (FIG. 4) extending upwardly to support the food mass thereon, and the cleaning plate 130 is receivable between the support portions 137 in a position below the food mass. The cleaning plate 130 includes grip tabs 138 allowing a user to manually rotate the cleaning plate 130 and, hence, the holder 14 relative to the base 12. After use of the slicer 10, the cleaning plate 130 is lifted upwardly and out from the sets of channels 90, 92 so that particulate matter (food particles) that results from the cutting of the food mass is lifted out of the sets of channels 90, 92, thus facilitating cleaning of the slicer 10.

Figure 4:
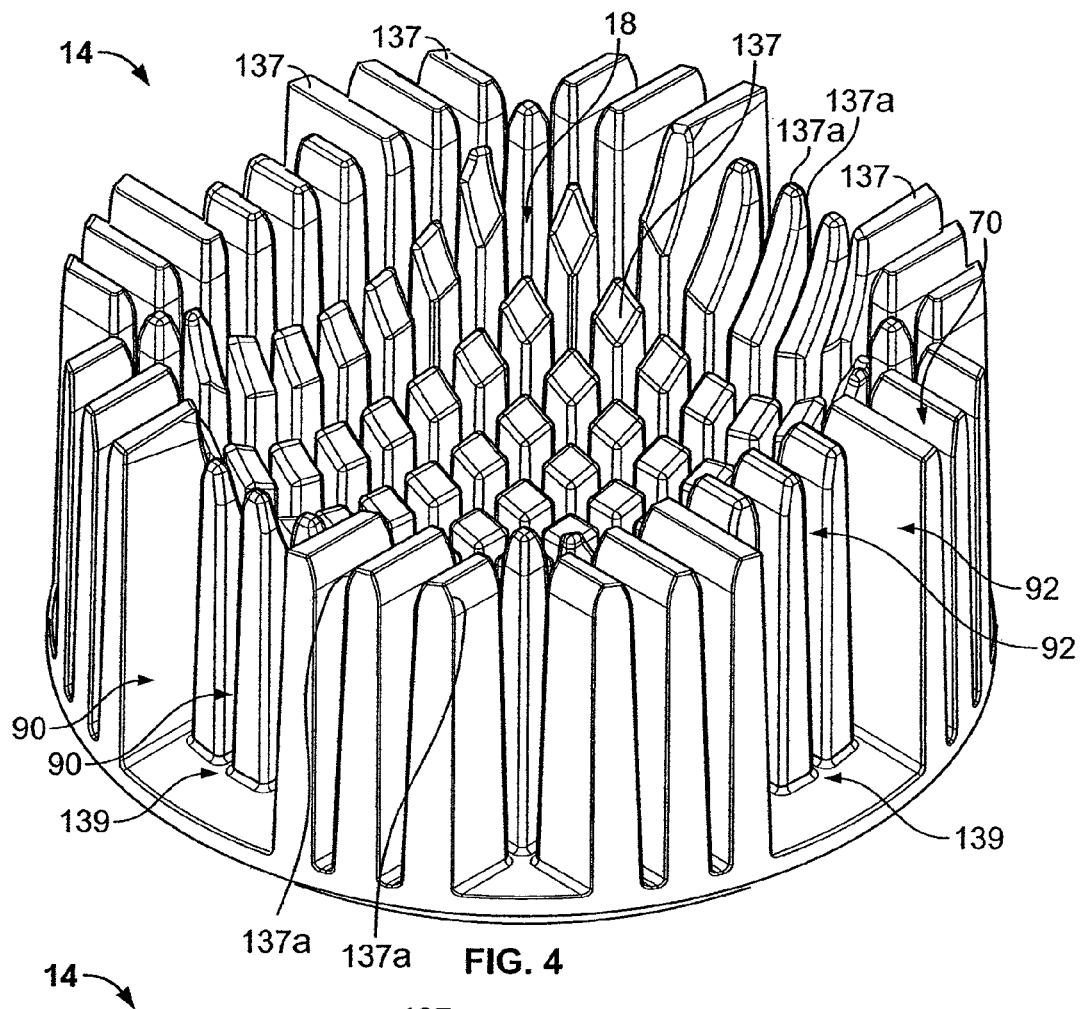
FIG. 4 is a perspective view of a holder of the egg slicer of FIG. 1.

Additionally, the frame 20 and the holder 14 are designed to promote and/or ensure that their relative alignment is proper prior to a cutting operation. As can be seen in FIG. 4, the support portions 137 of the holder 14 have beveled or chamfered edges 137a. The edges 137a promote directing the cutting members 80 into the channels 90, 92, as the frame 20 is lowered with respect to the holder 14. Additionally, the support portions 137 located around the perimeter 70 are radially shortened. That is, four recessed areas 139 are provided that correspond to the positions of the holder 14 relative to the base 12 (see FIG. 7). With reference to FIG. 10, the frame 20 includes a registry portion 141 extending inwardly into the opening 21. If the holder 14 is properly positioned relative to the base 12, the registry portion 141 will pass easily into one of the recessed areas 139. If the holder 14 is misaligned, the registry portion 141 will instead contact the support portions 137 surrounding the recessed area 139, and the user will be unable to lower the frame 20 beyond this point. In this manner, the cutting members 80 are protected from being forced against the support portions 137 which otherwise may lead to breakage or damage.

Referring now to FIG. 14, the slicer 10 can be seen in the open configuration. The retainer recess 72 is shown as being contoured for an egg, as is the holder recess 18. The recesses 72, 18 may have a major dimension and a minor dimension so that the ovoid or oval egg mass has a specified orientation when placed therein.

Turning now to FIGS. 14-17, it can be seen that the slicer 10 is provided with a lock mechanism 140. The lock mechanism 140 is generally utilized to secure the slicer 10 in the lowest configuration, such as would be desirable for storing the slicer 10.

The lock mechanism 140 is a push-button-type mechanism. The lock mechanism 140 includes a lock member 142 having a button portion 144 located rearwardly thereof. When the lock member 142 is assembled with the slicing mechanism 16 and the base 14, the button portion 144 extends through an opening 146 in the retainer 50 (FIG. 14).

The lock member 142 has a pivot end 150 secured via a pin 152 that is, itself, secured with the retainer 50. In FIG. 14, with the frame 20 and retainer 50 fully biased away from each other by the spring 40, the lock mechanism 140 cannot be secured. In other words, the frame 20 and retainer 50 need to be in the lowest position, as shown in FIGS. 15 and 16, for the lock member 142 to secure the frame 20 and the retainer 50.

Figure 15:
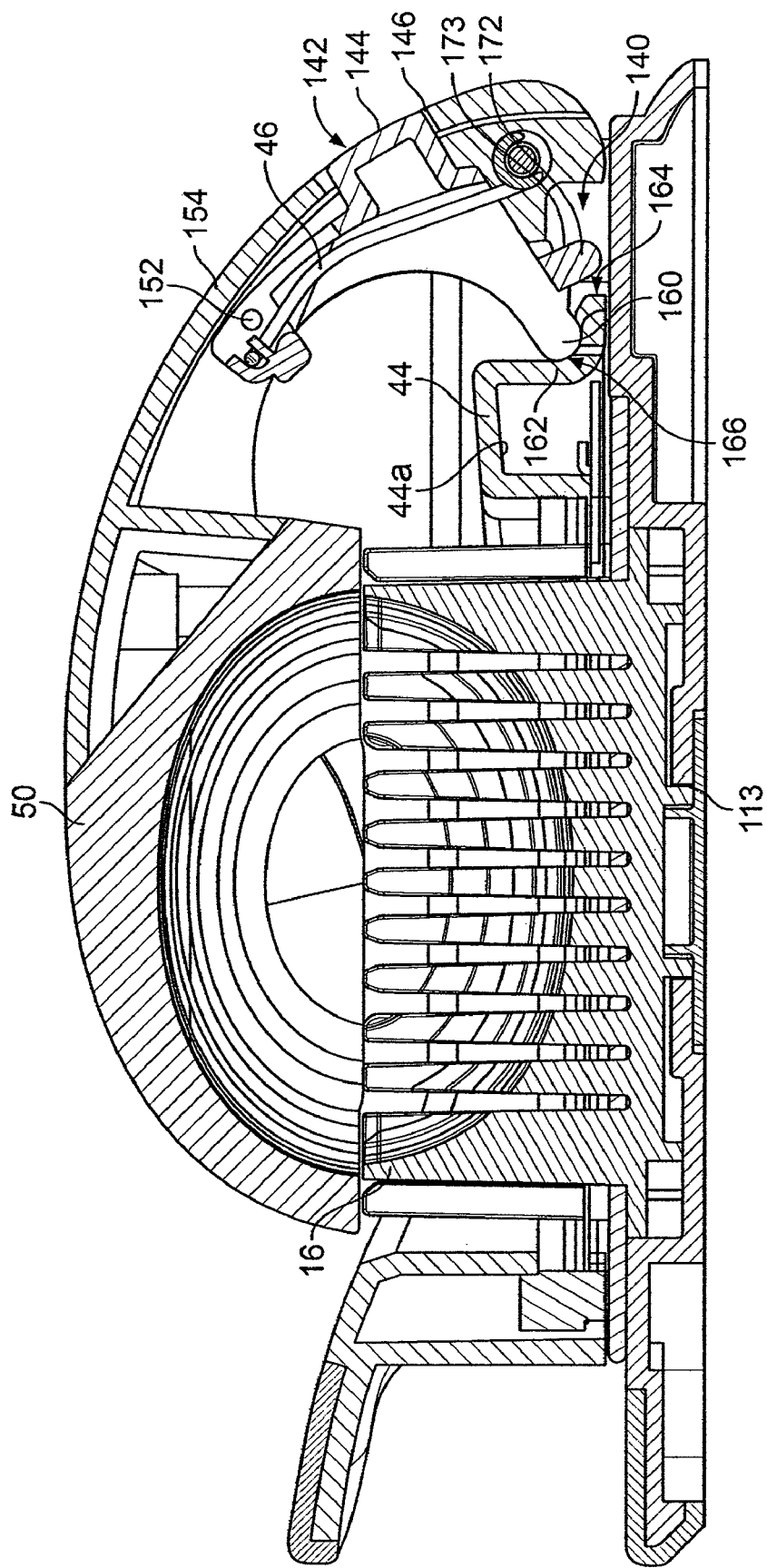
FIG. 15 is a view in cross-section taken from a first side of the egg slicer in the lowest position of FIG. 3.
Figure 16:
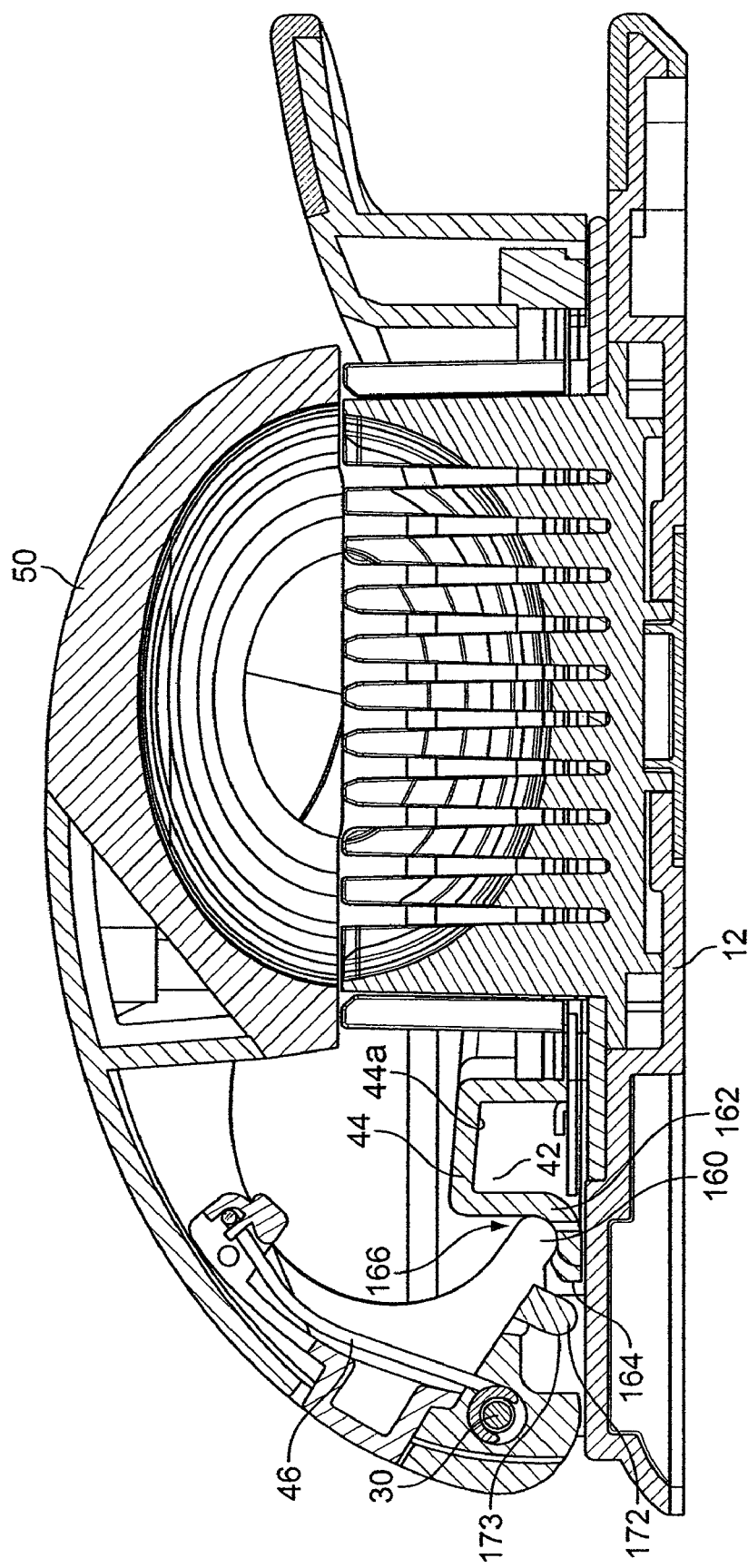
FIG. 16 is a view in cross-section similar to FIG. 15 and taken from a second side of the egg slicer in the lowest position.
Figure 17:
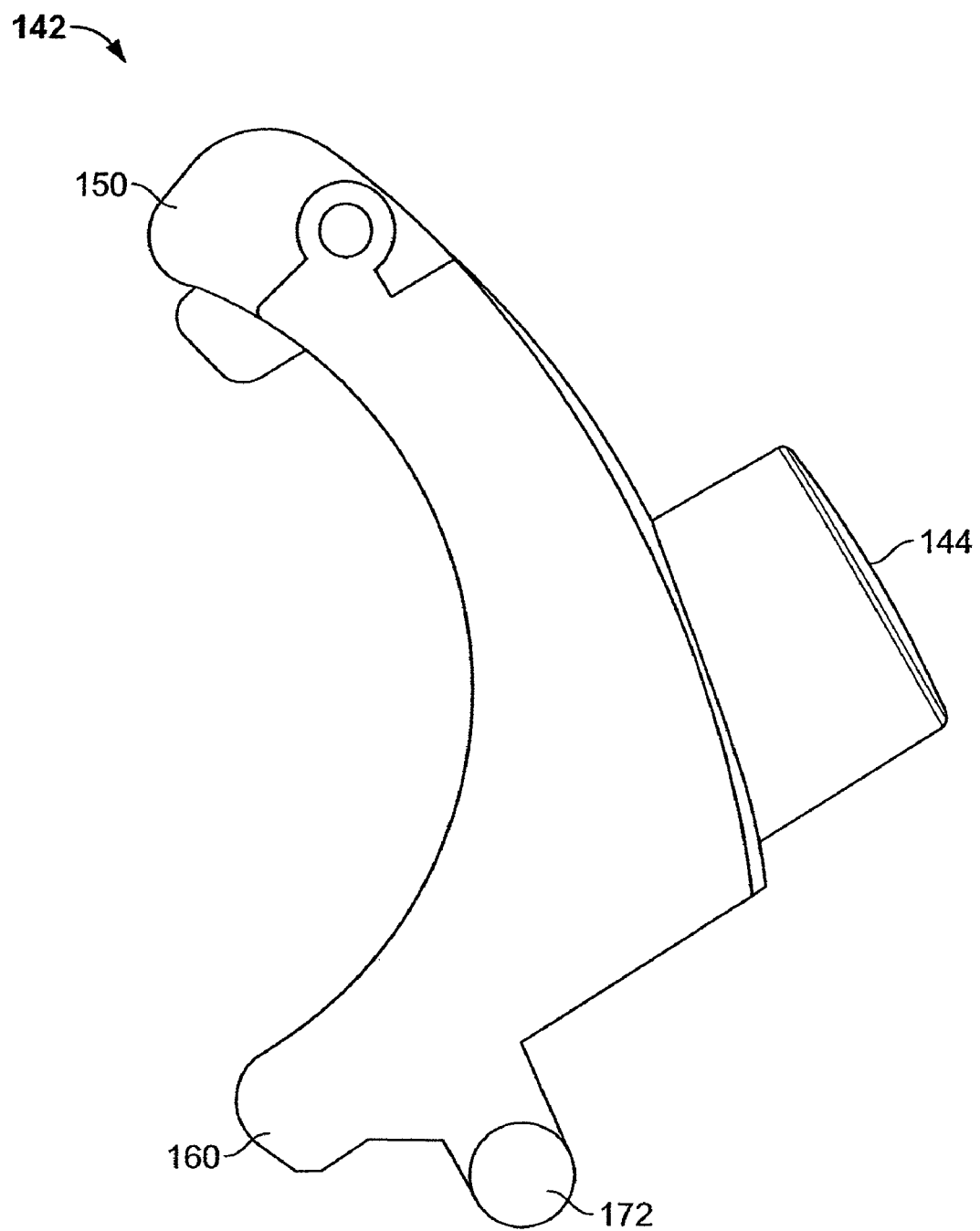
FIG. 17 is a side elevation view of a locking member of the egg slicer of FIG. 1.
Figure 18:
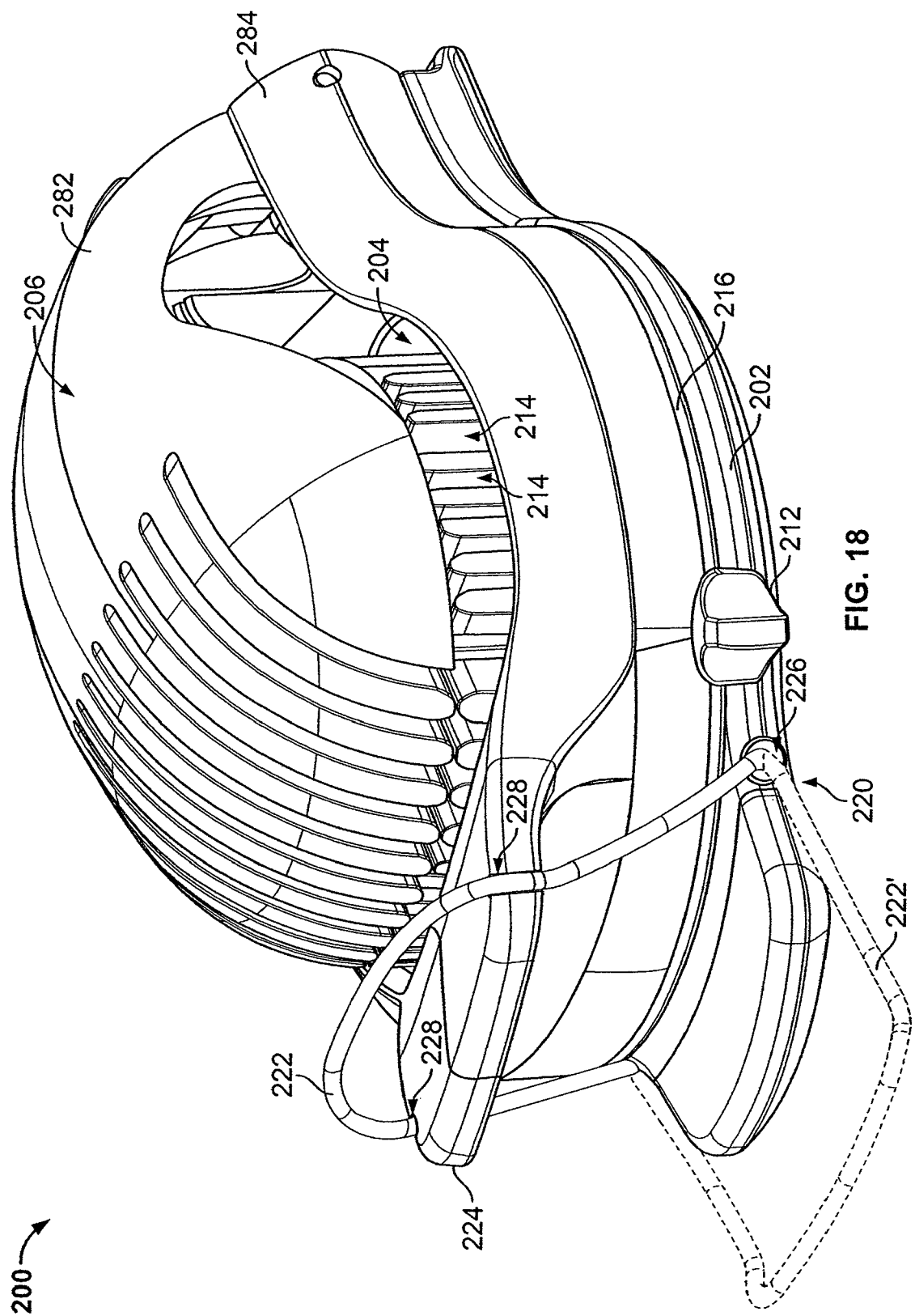
FIG. 18 is a perspective view of a second form of an egg slicer of the present invention in a closed or lowest position.

With reference to FIGS. 15 and 16, the lock member 142 has an engaging end 160 for securing the frame 20 and retainer 50 in the relative orientation of the lowest position or configuration. To be precise, the lock member 142 is advanced forward by pressing on the button portion 144. This pressing rotates the lock member pivot end 150 around the pin 152 so that the engaging end 160 ramps over a portion of the frame 20. More precisely, the frame 20 includes a resilient arm 162 with a slight curve at a terminal end 164 thereof so that a shallow hook 166 is formed. As the lock member 142 is advanced forwardly, the engaging end 160 thereof deflects the arm 162 downward by contacting the terminal end 164. After a short distance, the engaging end 160 is received within the hook 166 which allows the arm 162 to shift back towards its natural position. At this point, the frame 20 and retainer 50 are generally secured relative to each other.

The lock member 142 also serves to secure the frame 20 and retainer 50 with the base 12. The base walls 24, discussed above, include recesses 178 which are best viewed in FIGS. 8 and 9. The lock member 142 includes outwardly extending posts 172 (FIG. 17) which are positionable within the recesses 178. In order to secure the frame 20 and the retainer 50 relative to each other, the bias of the spring 40 must be overcome. Therefore, it is most convenient for this to happen by moving the slicing mechanism 16 to the lowest position or configuration. When the lock member 142 is advanced with the slicing mechanism 16 in the lowest configuration, the posts 172 are shifted (from recesses 173 of the retainer 50, see FIG. 13) to a position within the recesses 178 of the base walls 24 so that they cooperate with the walls 24 to prevent the secured slicing mechanism 16 from being lifted up. More specifically, each of the posts 172 contacts a shoulder 174 on its respective wall 24, the shoulder 174 partially defining the recess 170 thereof.

In order to release the lock mechanism 140, one need only lift upwardly on the frame 20 by lifting on the handle 64. This causes the frame arm 162 to deflect so that it can slip around the lock member engaging end 160, at which point the lock member 142 shifts so that it pivots to the unlocked position, and the posts 172 pass through channels 178a communicating with the base wall recesses 178.

Turning to FIGS. 18-24, another form of egg slicer 200 is depicted. To the extent the slicer 200 is substantially identical to the slicer 10, above, some features are not here repeated. The slicer 200 is similar to the above described forms and, as such, has a base 202 supporting a holder 204 for receiving and supporting the egg mass during the cutting or slicing process. A slicing mechanism 206 is pivotally attached to the base 202 and is shown in a closed or lowest position relative to the base 202. A cleaning grid 210 is provided with a finger grip 212 which may be used to rotate the holder 204 and to lift the cleaning grid 210 from channels 214 formed in the holder 204.

While the slicer 10 includes a lock mechanism 140, the form of such is omitted in the slicer 200 form. Instead, the slicer 200 includes a lock member 220 in the form of a wire 222 that cooperates with a handle portion 224 formed on the slicing mechanism 206. The base 202 includes bores 226 for receiving ends of the wire 222. The wire 222 forms somewhat of a U-shape and is pivotable within the bores 226 from a raised position hooked around the handle 224 and may be unhooked and lowered to a position 222' shown in FIG. 18. The handle portion 224 further includes recesses 228 for receiving the wire 222 therein.

Figure 19:
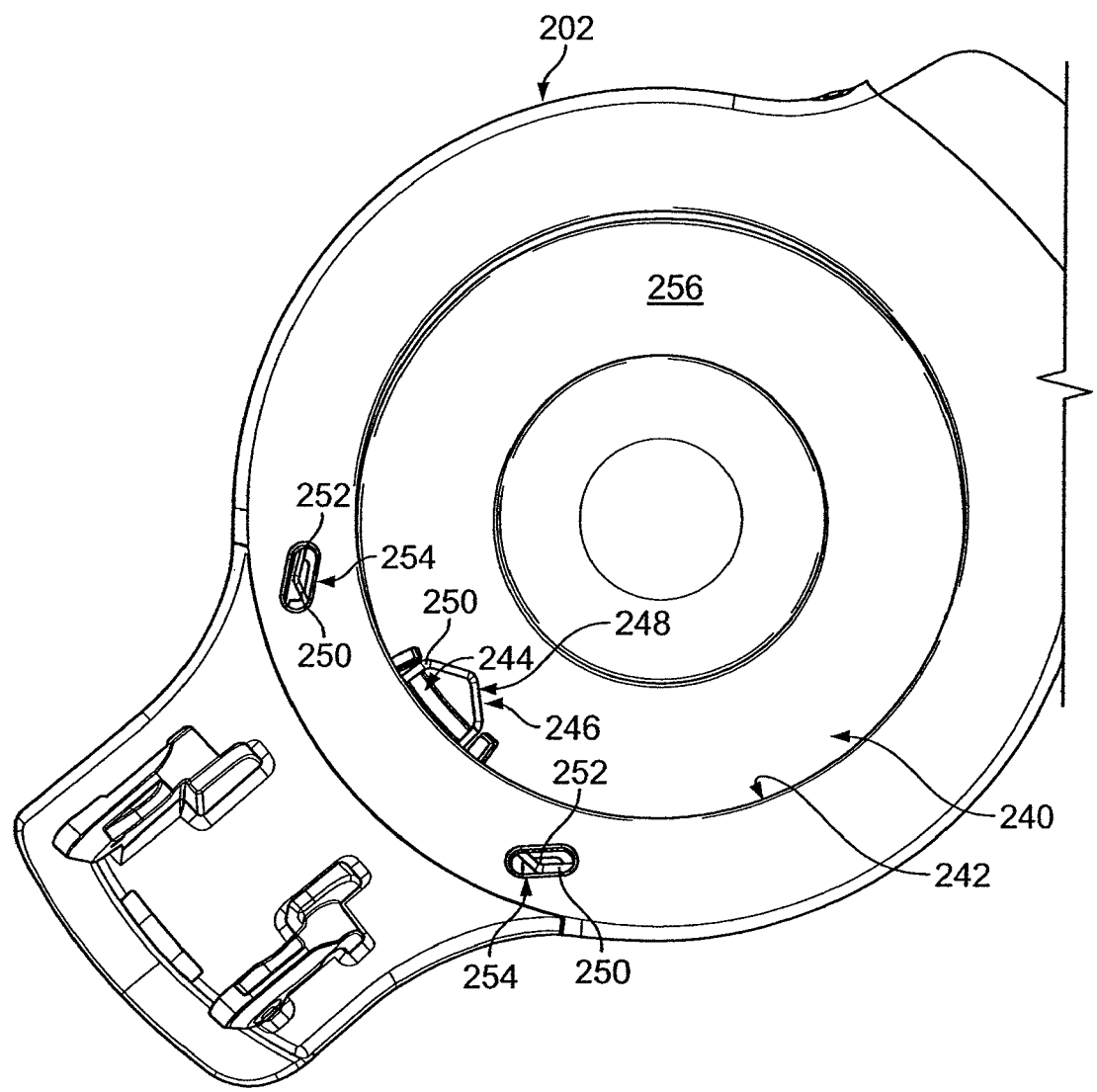
FIG. 19 is a fragmentary top plan view of a base of the egg slicer of FIG. 18 showing a recess in which a holder is received and a position defining portion in the recess.
Figure 20:
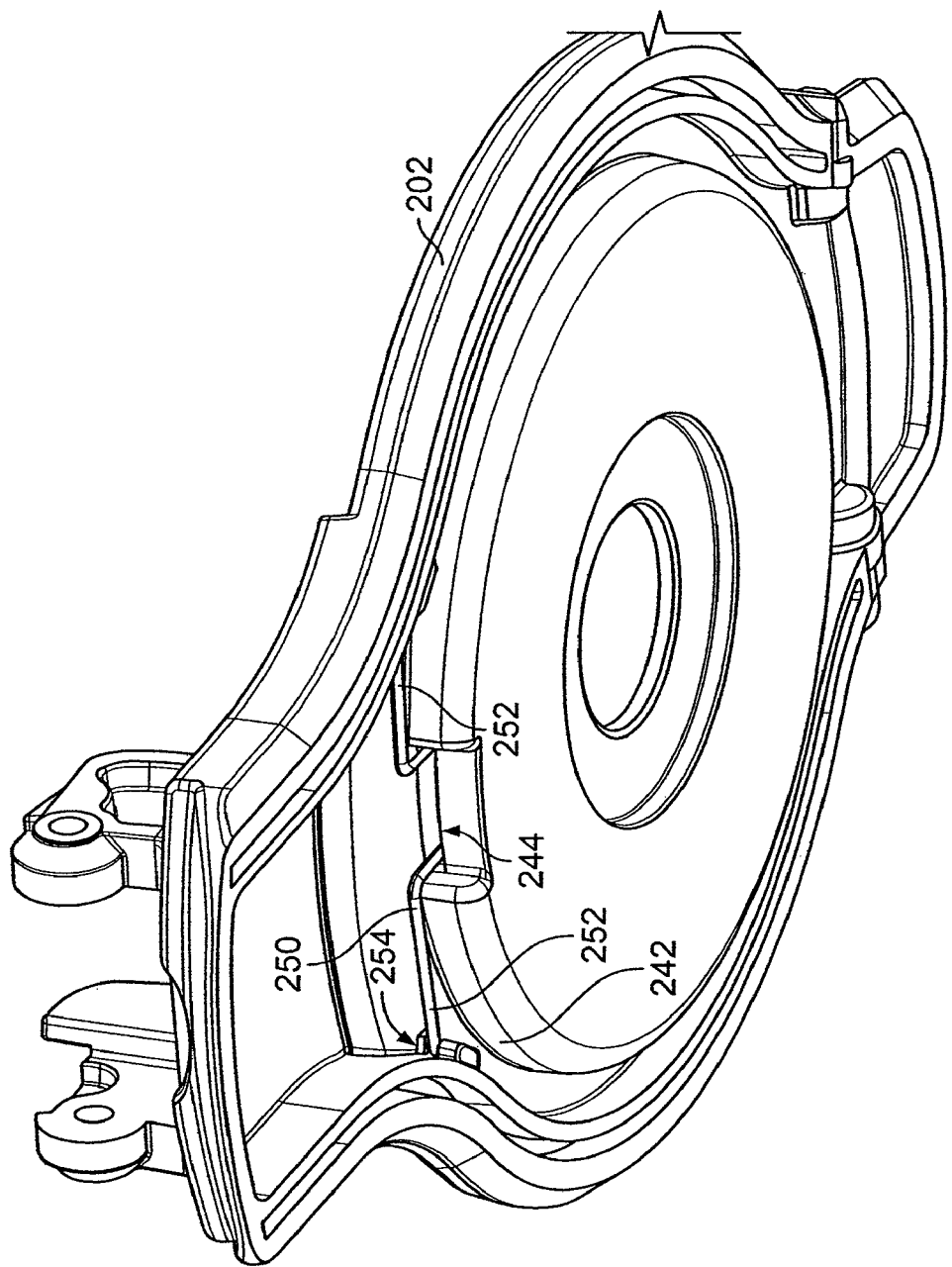
FIG. 20 is a perspective bottom view of the base of FIG. 19.
Figure 21:
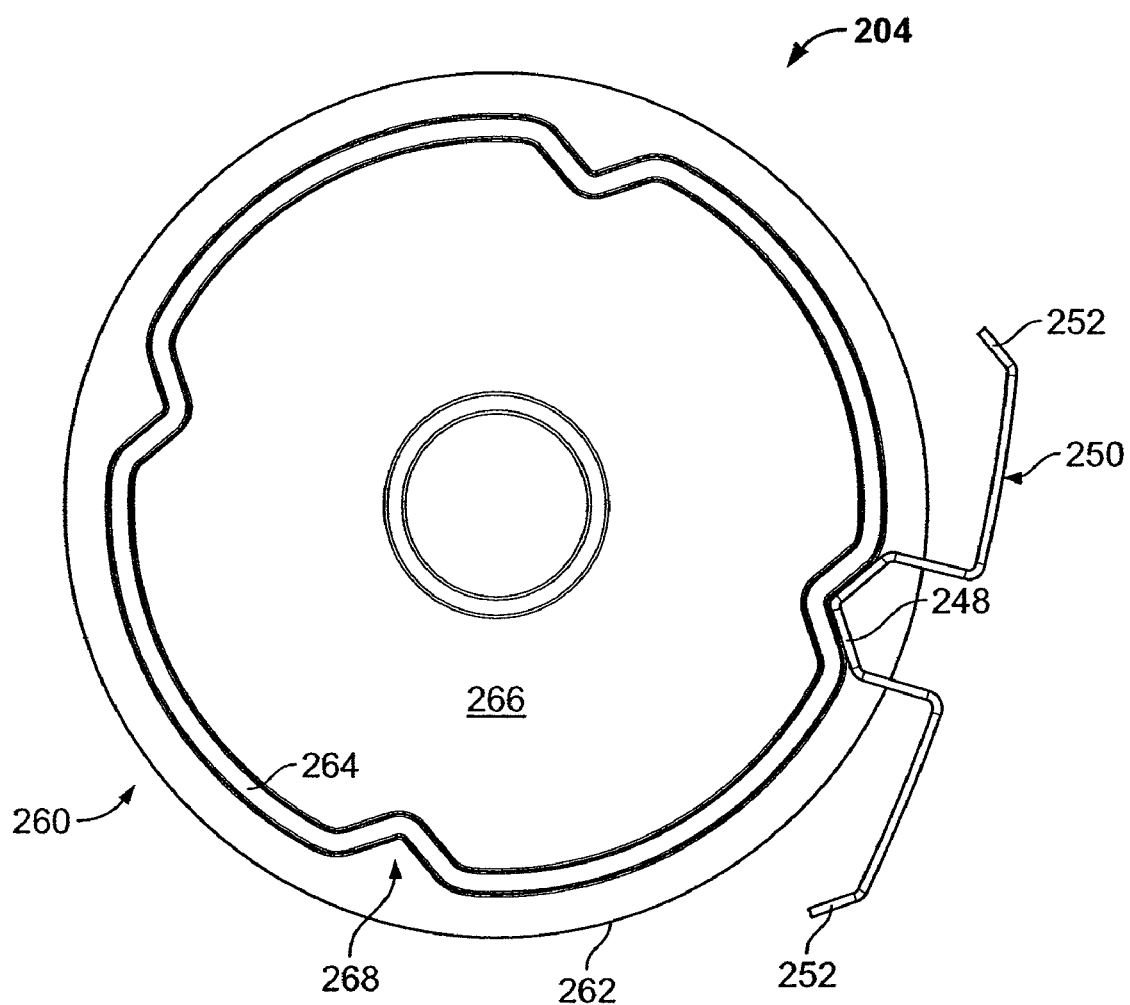
FIG. 21 is a bottom plan perspective view of the holder.

Like the previous slicer 10 in its forms, the slicer 200 provides defined positions for the rotatable holder 204. Towards this end, the base 202 includes a recess 240 into which a bottom portion 260 of the holder 204 (see FIG. 21) is received. Turning to FIGS. 19-21, the recess 240 is surrounded by a sidewall 242 including an opening 244 therethrough. A positioning portion 246 is provided within the recess 240, and, in the present form, the positioning portion 246 provides a spring-biased stop 248 formed on a spring retainer member 250. A portion of the spring retainer member 250 is inserted through the opening 244 so that the stop 248 is within the recess 240. Additionally, leg portions 252 of the spring retainer member 250 are secured in secondary recesses 254 formed in the base 202 to secure the spring retainer member 250 therewith while also allowing the stop 248 and its adjacent portions to deflect radially outward from the recess 240 as the holder 204 is rotated, as will be discussed below.

With specific reference to FIG. 21, the bottom portion 260 of the holder 204 is shown in engaged cooperation with the spring retainer member 250 and stop 248 thereon. The holder 204 has a peripheral surface or edge 262 which is located in close proximity to the recess sidewall 242 when received in the recess 240. A short wall 264 is formed on a bottom side 266 (facing base 202 when received in the recess 240) and is in contact with a bottom interior surface 256 of the recess 240. The wall 264 includes a plurality of jogs or detents 268, each detent 268 cooperating with the spring retainer member 250 when the holder 204 is aligned with the base 202 in a particular defined positioned, as shown in FIG. 21. When the holder 204 is rotated away from the defined position, the detents 268 cam the spring retainer stop 248 radially outwardly. Once the holder 204 is rotated sufficiently, the spring retainer stop 248 once again will become aligned with one of the detents 268 and will shift thereinto. Additionally, the spring retainer stop 248 will assist slightly in advancing the holder 204 to the aligned position by force of its bias. In a preferred form, the spring retainer stop 248 has a shape that is complementary to the shape of the detents 268 and, in the depicted form, each is somewhat V- or triangular-shaped.

Figure 22:
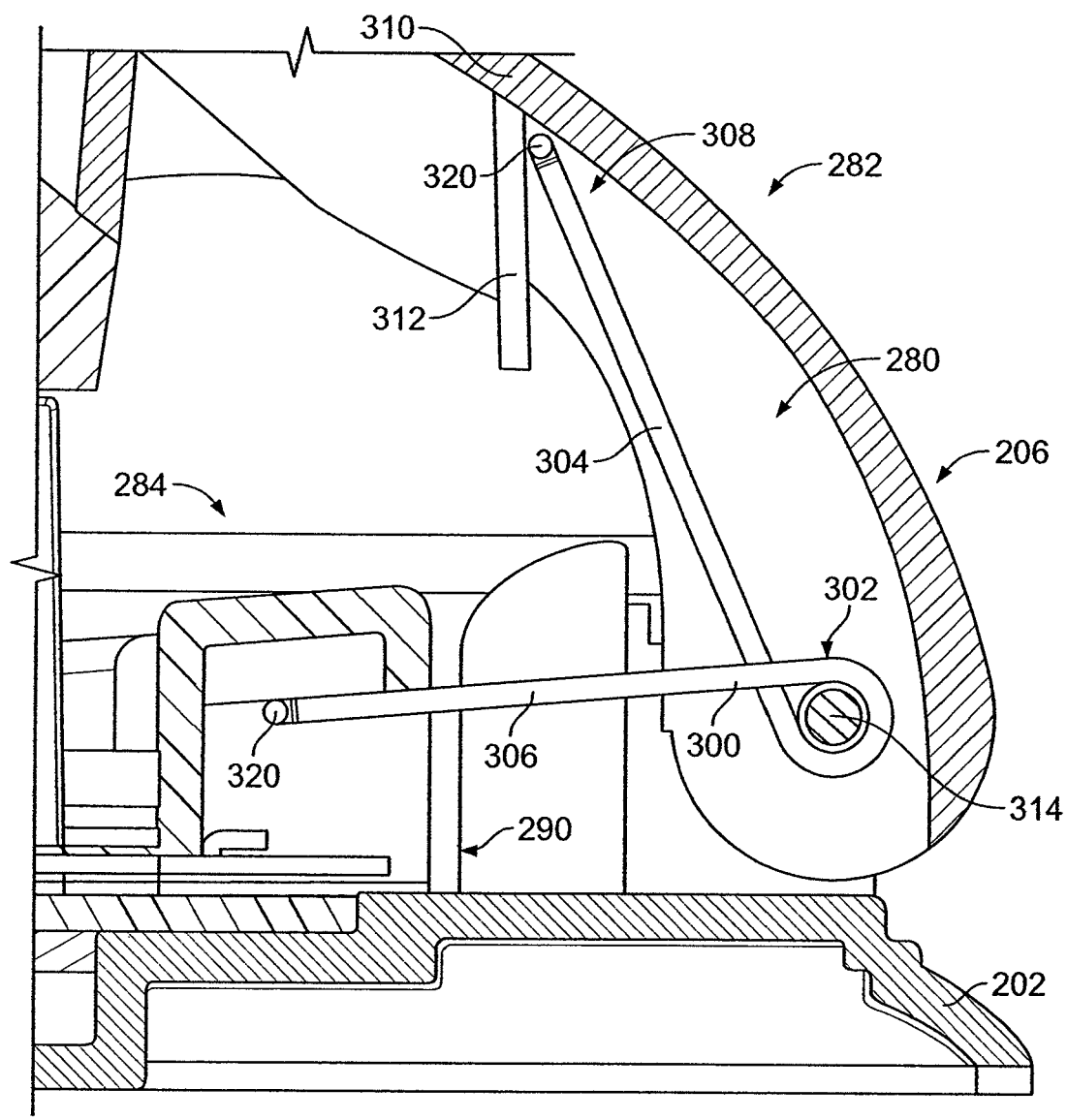
FIG. 22 is a cross-sectional view of a rear end of the slicer showing a bias mechanism and structure therefore.
Figure 23:
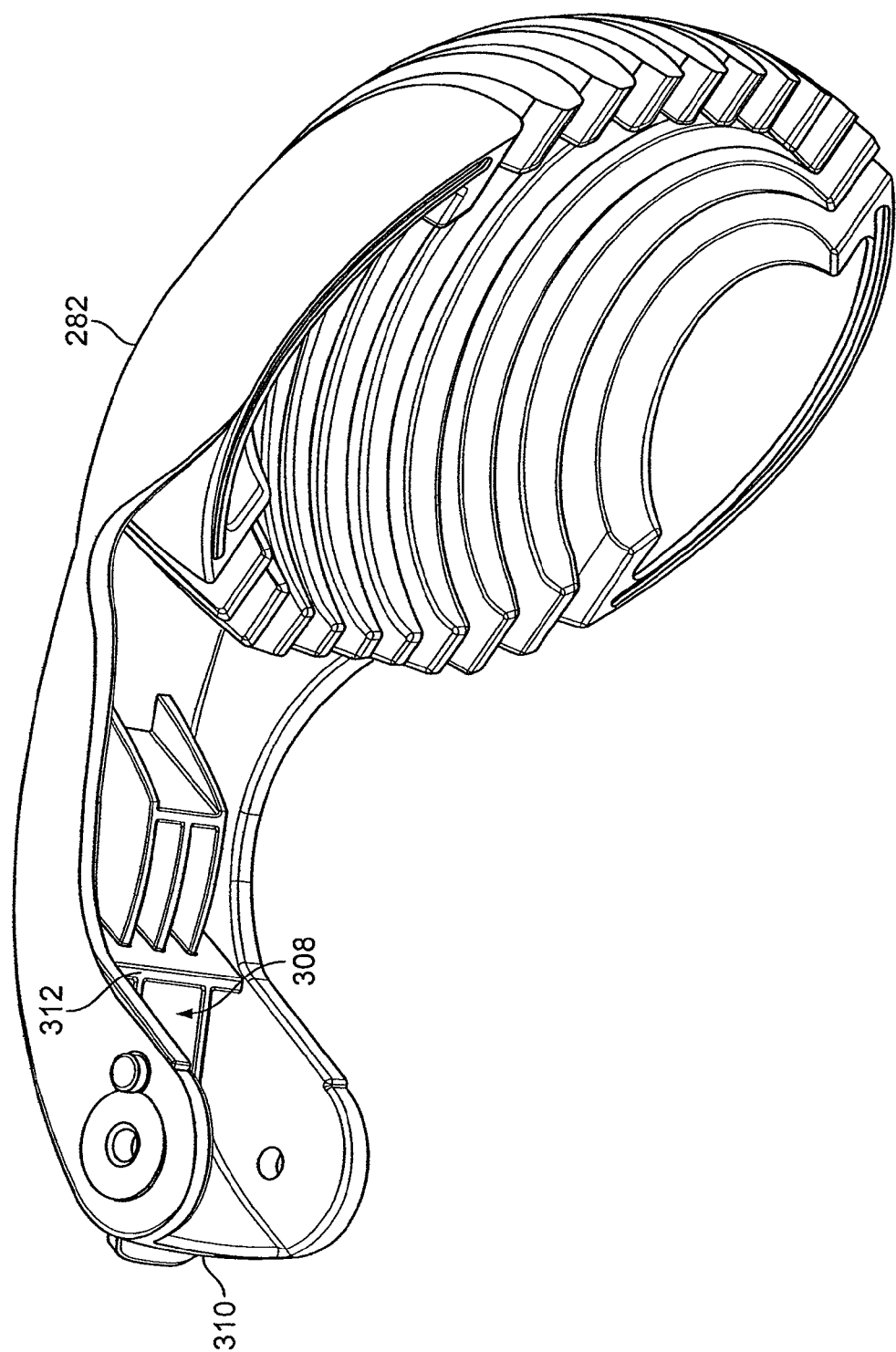
FIG. 23 is a bottom perspective view of a retainer of the egg slicer of FIG. 18 showing a recess for the bias mechanism.
Figure 24:
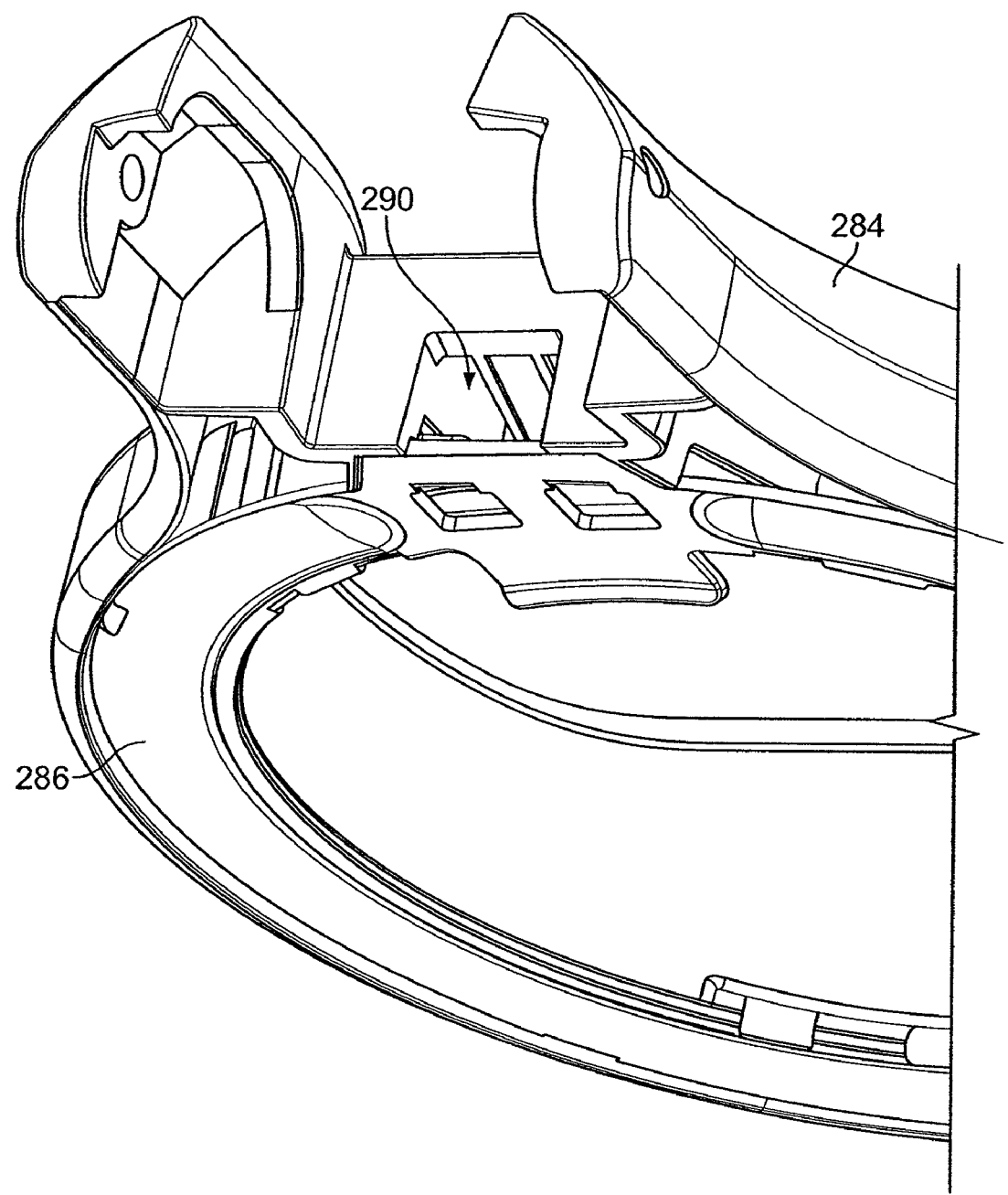
FIG. 24 is a fragmentary perspective view of a rear end of a frame of the egg slicer of FIG. 18 showing an opening for the bias mechanism.

Turning now to FIGS. 22-24, the slicer 200 includes a bias mechanism 280 for relative positioning of portions of the slicing mechanism 206. More specifically, the slicing mechanism 206 includes a retainer 282 that is positioned on top of the egg mass and proximate the holder 204 (as described for the above slicer 10), and includes a frame 284 carrying cutting members 80 (see FIG. 10) supported by a secondary frame 286 (similar to secondary frame 88). In FIG. 24, the cutting members 204 have been omitted so that the frame 284 is shown secured with the secondary frame 286, the two frames 284, 286 defining an opening 290.

In the present form, the bias mechanism 280 includes a wire spring 300 having a central coil 302 providing bias to upper and lower legs 304, 306. The upper leg 304 is received in a recess 308 formed in the retainer 282 (FIG. 23); in greater detail, the recess 308 is a somewhat V-shaped portion defined by an outerwall 310 of the retainer 282 and an internal wall 312 extending from the outerwall 310. The central coil 302 is positioned on an axle 314 similar to the axle 30 described above utilized for allowing the slicing mechanism 206 to rotate or pivot relative to the base 202.

The lower leg 306 of the spring 300 is positioned within the opening 290 formed between the frames 284, 286 (see FIGS. 22 and 24). As constructed, the bias provided by the bias mechanism 280 tends to pull ends 320 of the legs 304, 306 towards each other. That is, as the slicing mechanism 206 is lowered, the retainer 282 will first come into contact with the holder 204 (or food mass thereon). Once this occurs, continued lowering of the frame 286 will be against the bias of the spring 300 such that the coil 302 is enlarged. When the frame 286 is released, it will naturally be drawn upward toward the retainer 282 so that the ends 320 of the spring 300 move toward each other.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An apparatus for partitioning a food mass, the apparatus comprising:
    a base;
    a holder for supporting the food mass on the base, the holder being connected to the base;
    a plurality of cutting members movable relative to the holder for partitioning the food mass; and
    a cleaning member,
    wherein the holder includes a plurality of support portions extending upwardly to support the food mass thereon and includes first and second sets of recesses between the support portions permitting first cutting members being receivable within the first set of holder recesses and second cutting members being receivable within the second set of holder recesses, the first set of holder recesses being oriented substantially orthogonal to the second set of holder recesses, the cleaning member being receivable in the holder recesses between the support portions in a position below the food mass and including openings for receiving the support portions, and the cleaning member being removable from the holder to remove food matter from between the support portions.

2. The apparatus of claim 1 wherein the cleaning member is plate.

* * * * *